US012151239B2

(12) United States Patent
Pais et al.

(10) Patent No.: US 12,151,239 B2
(45) Date of Patent: Nov. 26, 2024

(54) AUTOMATED POINT-OF-CARE DEVICES FOR COMPLEX SAMPLE PROCESSING AND METHODS OF USE THEREOF

(71) Applicant: NOVEL MICRODEVICES, INC., Baltimore, MD (US)

(72) Inventors: Andrea Maria Dominic Pais, Annapolis, MD (US); Rohan Joseph Alexander Pais, Baltimore, MD (US)

(73) Assignee: NOVEL MICRODEVICES, INC., Baltimore, MD (US)

( * ) Notice: Subject to any disclaimer, the term of this patent is extended or adjusted under 35 U.S.C. 154(b) by 0 days.

(21) Appl. No.: 17/747,001

(22) Filed: May 18, 2022

(65) Prior Publication Data

US 2022/0379306 A1 Dec. 1, 2022

Related U.S. Application Data

(62) Division of application No. 16/465,982, filed as application No. PCT/US2017/064359 on Dec. 1, 2017, now Pat. No. 11,364,495.

(Continued)

(51) Int. Cl.

| | |
|---|---|
| ***B01L 3/00*** | (2006.01) |
| ***B01F 23/00*** | (2022.01) |
| ***B01F 23/41*** | (2022.01) |
| ***B01F 101/23*** | (2022.01) |
| ***B01L 7/00*** | (2006.01) |

(Continued)

(52) U.S. Cl.
CPC ..... *B01L 3/502715* (2013.01); *B01L 3/50273* (2013.01); *B01L 7/5255* (2013.01);
(Continued)

(58) Field of Classification Search
CPC ........... B01L 3/502715; B01L 3/50273; B01L 2200/027; B01L 2200/0621; B01L 2200/0673; B01L 2200/16; B01L 2300/044; B01L 2300/06; B01L 2300/1805; B01L 2400/0409; B01L 2400/0475; B01L 2400/0622; B01L 3/5029; B01L 3/523; B01L 3/527; B01L 3/52; B01L 7/525;
(Continued)

(56) References Cited

U.S. PATENT DOCUMENTS

| | | | |
|---|---|---|---|
| 8,318,439 | B2 | 11/2012 | Battrell |
| 2005/0255007 | A1 | 11/2005 | Yamada |

(Continued)

FOREIGN PATENT DOCUMENTS

| | | | |
|---|---|---|---|
| CN | 104981698 | A | 10/2015 |
| JP | H11514849 | | 12/1999 |

(Continued)

OTHER PUBLICATIONS

EP 17877194.5 Extended European Search Report dated Jun. 23, 2020.

*Primary Examiner* — Jennifer Wecker
*Assistant Examiner* — Oyeleye Alexander Alabi
(74) *Attorney, Agent, or Firm* — FISHERBROYLES, LLP

(57) ABSTRACT

The present invention provides methods and devices for simple, low power, automated processing of biological samples through multiple sample preparation and assay steps. The methods and devices described facilitate the point-of-care implementation of complex diagnostic assays in equipment-free, non-laboratory settings.

28 Claims, 17 Drawing Sheets

Related U.S. Application Data

(60) Provisional application No. 62/428,976, filed on Dec. 1, 2016.

(51) Int. Cl.

| | |
|---|---|
| ***B23Q 17/24*** | (2006.01) |
| ***C12M 1/34*** | (2006.01) |
| ***C12Q 1/18*** | (2006.01) |
| ***G01N 21/3577*** | (2014.01) |
| ***G01N 21/359*** | (2014.01) |
| ***G01N 21/39*** | (2006.01) |
| ***G01N 21/45*** | (2006.01) |
| ***G01N 21/64*** | (2006.01) |
| ***G01N 30/12*** | (2006.01) |
| ***G01N 30/68*** | (2006.01) |
| ***G01N 30/70*** | (2006.01) |
| ***G01N 30/72*** | (2006.01) |
| ***G01N 30/88*** | (2006.01) |
| ***G01N 33/00*** | (2006.01) |
| ***G01N 33/50*** | (2006.01) |
| ***G01N 33/68*** | (2006.01) |

(52) U.S. Cl.

CPC . *B01L 2200/027* (2013.01); *B01L 2200/0621* (2013.01); *B01L 2200/0673* (2013.01); *B01L 2200/16* (2013.01); *B01L 2300/044* (2013.01); *B01L 2300/047* (2013.01); *B01L 2300/06* (2013.01); *B01L 2300/1805* (2013.01); *B01L 2400/0409* (2013.01); *B01L 2400/0475* (2013.01); *B01L 2400/0622* (2013.01)

(58) Field of Classification Search

CPC ........... B01L 2300/04; B01L 2300/041; B01L 2400/0481

See application file for complete search history.

(56) References Cited

U.S. PATENT DOCUMENTS

2008/0003142 A1* 1/2008 Link .................. C12N 15/1086 264/219
2008/0145272 A1* 6/2008 Feaster ................. B01L 3/5023 422/69
2010/0112723 A1* 5/2010 Battrell ............. B01L 3/502746 422/68.1
2010/0144054 A1 6/2010 Hanafusa
2010/0218621 A1 9/2010 Chen
2010/0304986 A1 12/2010 Chen
2012/0122232 A1 5/2012 Ching
2013/0029324 A1 1/2013 Rajagopal
2013/0344496 A1 12/2013 Peytavi
2014/0017687 A1* 1/2014 Wimberger-Friedl ........................ B01L 3/502784 435/6.11
2014/0051178 A1 2/2014 Niggel
2014/0194305 A1* 7/2014 Kayyem .............. C12Q 1/6825 506/18
2015/0328638 A1 11/2015 Handique
2017/0096697 A1* 4/2017 Donnelly ....... C12Y 113/12007
2018/0264471 A1* 9/2018 Boehm ............ G01N 35/00069

FOREIGN PATENT DOCUMENTS

JP 2006138866 A 6/2006
JP 2009531064 9/2009
JP 2010506136 2/2010
JP 2010271304 12/2010
JP 2015534808 12/2015
JP 2016509475 3/2016
JP 2016532075 10/2016
WO 2016175229 11/2016

* cited by examiner

AUTOMATED POINT-OF-CARE DEVICES FOR COMPLEX SAMPLE PROCESSING AND METHODS OF USE THEREOF

CROSS REFERENCE TO RELATED APPLICATIONS

This application is a divisional of U.S. application Ser. No. 16/465,982 filed on May 31, 2019, which is a national phase 35 U.S.C. 371 of PCT/US2017/064359 filed on Dec. 1, 2017, both of which claim priority to U.S. Provisional Application No. 62/428,976, filed Dec. 1, 2016; the entire content of which is hereby incorporated by reference herein in its entirety.

BACKGROUND

Point-of-Care ("POC") devices allow for convenient and rapid testing at the site of patient care. Accordingly, Sample-to-Answer and Lab-On-a-Chip ("LOC") systems, types of POC devices integrating microfluidics technology, have become increasingly popular. These LOCs integrate various lab functions, such as extraction, amplification, detection, interpretation, and reporting, previously performed manually and/or off-site, all on the same device. Because Sample-to-Answer and LOC testing are performed at the site of patient care and not in a lab facility, these types of tests have had issues with contamination control, particularly in steps which involve human interaction during the process. As such, there is a need to automate the sample processing within a sample-to-answer LOC that minimizes human interaction. These sample-to-answer and LOCs are generally a few square millimeters to a few square centimeters in size, and are often types of microelectromechanical systems ("MEMS"). MEMS that are capable of detecting and analyzing biological material such as here are generally referred to as Bio-MEMS.

Most POC diagnostic devices on the market are categorized as either high or moderate complexity under Clinical Laboratory Improvement Amendments ("CLIA"). These federal guidelines generally apply to clinical laboratory testing instruments on humans, except in certain conditions which allow for waiver of these guidelines. One of these conditions is when the device or instrument meets certain risk, error, and complexity requirements. In order to make a POC diagnostic test eligible to be CLIA-waived, the sample preparation and fluid handling steps need to be minimized. One way to minimize these steps is to store the reagents in a sealed device such as a blister or burst pouch to be released.

Reagent delivery into a microfluidic chip commonly includes the use of pumps, such as syringe pumps or peristaltic pumps, and external reagent-filled bottles, syringes, or reservoirs. These systems are not only difficult to make portable, but also are complex due to the numerous components that have to be integrated together and the need for leak-free fluidic interfaces into the microfluidic chip. Methods to enable simple, miniaturized, and low-power automation of fluid handling have yet to be successfully implemented in the commercial state-of-the art. Accordingly, this has been seen as a roadblock preventing POC implementation in a majority of the multi-step bioassay tests that are still being conducted in large clinical facilities.

Complex bioassays that require multiple processing steps, including but not limited to pipetting, heating, cooling, mixing, washing, incubating, labeling, binding, and eluting, rely on expensive lab automation equipment to run the sample-to-answer sequence. Low-cost, low-power, miniaturized instrumentation for automation of the sample-to-answer sequence is yet to be realized and, as such, point-of-care microfluidic devices for running a sample-to-answer sequence rely on additional instrumentation that takes the form of a standalone bench top or portable instrument to run the assay on a microfluidic device. Implementing separate instrumentation that can automate the sample processing steps on the microfluidic cartridge is seen as a way to keep the cost per test, and hence the cost of the cartridge, low. In systems developed for point-of-care applications, this can take the form of a portable bench top instrument with solenoid plungers, linear actuators, microcontrollers, and electronic circuitry to automate the sample processing sequence. While this instrumentation gives the user control over the sample processing sequence, it requires controlled environments and a considerable amount of electrical power to run. These point-of-care systems are not feasible in low resource settings where no infrastructure exists to run the instrument, or for home and non-hospital settings where laypersons either do not see the need or cannot afford to purchase a costly instrument for a test, or are not trained to operate the instrument that goes along with the test. As such, developing methods to enable, low power, stand-alone, inexpensive, and disposable instrumentation that can be directly integrated onto the microfluidic device and that can run the automated sample-to-answer sequence is seen as a roadblock for developing single use test devices that can run complex multi-step nucleic acid, protein, and immunoassays from sample-to-answer.

Disposable tests that do not require instrumentation to run them are limited to Simple Single Step Assays and Multi-Step Assays. In Simple Single Step Assays, the sample is the only liquid and no reagents are used. These tests typically include dipstick tests such as urine test strips and pregnancy tests. Multi-Step Assays are sold in the form of a kit comprising reagent vials and an instruction set wherein the user is relied upon to follow the instructions and dispense the reagents into different regions of the disposable test cartridge. These devices typically run immunoassays that do not require sample preparation steps. Some examples of these devices include, but are not limited to, Chembio Diagnostic Systems, Inc.'s DPP® HIV 1/2 Assay, SURE CHECK® HIV 1/2, HIV 1/2 STAT-PAK®, and HIV 1/2 STAT-PAK® DIPSTICK tests. These tests rely on the user to manually perform a series of steps to complete the sequence. There is a risk for the test being performed incorrectly if the user is not skilled or does not follow the instructions correctly, thus results can vary depending on how the test was performed. Moreover, there is an additional risk of contamination when the reagents are not completely contained inside the device. Some harsh reagents that are harmful to handle without proper lab protocols, gloves, and equipment (e.g., fume hoods and lab infrastructure such as a contained biosafety facility) cannot be implemented in these kit tests unless the test is being performed by trained technicians in a contained facility.

Laypersons risk running a test incorrectly if the test is not simple and automated. As the test complexity increases beyond two or three steps, these manual kit-based tests fall short in their utility. Advances in nucleic acid amplification assays (e.g., isothermal assays such as loop-mediated-amplification) reduce the instrumentation burden for heating/cooling thermal-cycling since these tests only require the sample to be held at a single temperature (usually between 60-70° C.). However, these tests still require multiple user initiated steps for completing the sample-to-answer sequence that require skilled operators or additional automation instrumentation.

Sample preparation is essential for many diagnostic assays involving the processing of biological samples. A biological sample typically goes through multiple complex processing steps before it is suitable to be used in an assay. These steps are required to isolate, concentrate, and/or purify the analyte of interest from a raw sample and to remove materials in the sample that can interfere with the desired assay. Sample processing steps often involve precise conditions for temperature, reagent volumes, and incubation times that need to be performed in a precise sequence and in a tightly controlled environment such as a laboratory setting. Conventional automation systems for sample processing involve highly complex and expensive instrumentation and skilled personnel to operate them. Since these systems are often placed in centralized labs, raw samples must frequently be properly stored and transferred to a lab at a different location for processing. These factors are associated with several limitations including high costs, delay in results, and compromised sample integrity due to shipping and improper storage.

International Patent Application PCT/US16/43911, filed Jul. 25, 2016, is directed to a Sample Processing Device Comprising Magnetic and Mechanical Actuating Elements Using Linear or Rotational Motion and Methods of Use Thereof. International Patent Application PCT/US16/43855, filed Jul. 25, 2016, is directed to a Sample Extraction Device and Methods of Use Thereof. The entire contents of both of these applications are incorporated by reference herein in their entireties.

The present invention provides methods and devices for simple, low power, automated processing of biological samples through multiple sample preparation and assay steps. The methods and devices described facilitate the point-of-care implementation of complex diagnostic assays in equipment-free, non-laboratory settings.

SUMMARY

In accordance with the present invention, various embodiments of sample extraction devices and methods of use thereof are disclosed.

In accordance with the present invention, a sample to answer microfluidic device, assay automation instrument and method for performing automated assays such as a nucleic acid amplification test (NAAT) on the microfluidic device are disclosed. The invention comprises a portable assay automation instrument and a microfluidic cartridge containing stored reagents in liquid and dried format that are dispensed in a predefined sequence to perform a sample to answer NAAT.

The present disclosure also includes various embodiments of sample processing devices and associated processing methods for maximizing sample elution efficiency when transferring a sample from a sample collection device (e.g., such as a swab) into a medium or buffer on a fluidic device, as well sample integration into the medium or buffer on the fluidic device.

Certain aspects of the presently disclosed subject matter having been stated hereinabove, which are addressed in whole or in part by the presently disclosed subject matter, other aspects will become evident as the description proceeds when taken in connection with the accompanying Examples and Figures as best described herein below.

BRIEF DESCRIPTION OF THE FIGURES

Having thus described the presently disclosed subject matter in general terms, reference will now be made to the accompanying Figures, which are not necessarily drawn to scale.

Figure 1A:
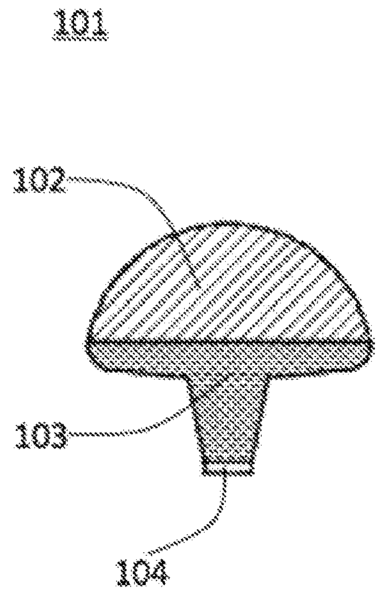

FIG. 1A is a cross-sectional view of an exemplary filled reagent pouch.

Figure 1B:
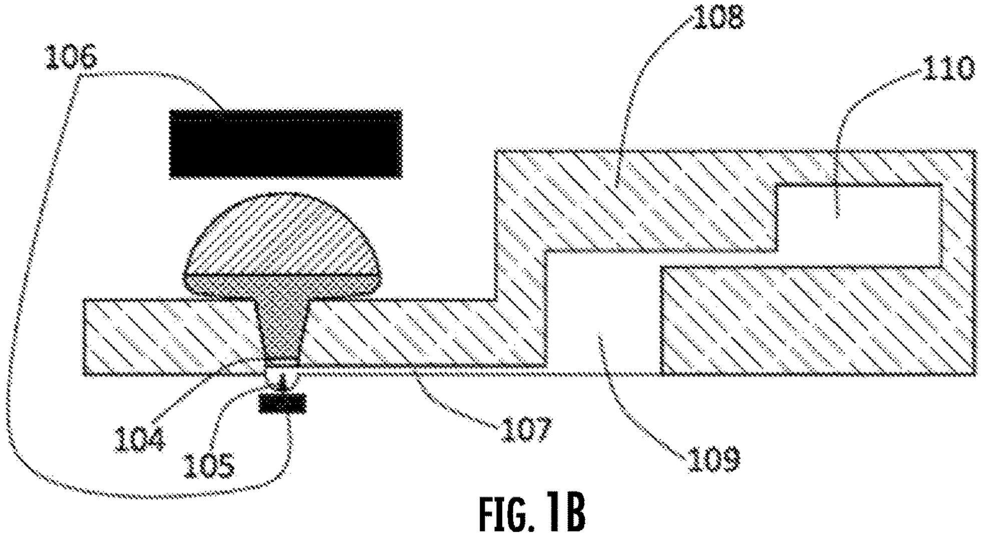

FIG. 1B is a cross sectional view of an exemplary microfluidic device with integrated Reagent Dispensing Unit (RDU) showing RDU before actuation.

Figure 1C:
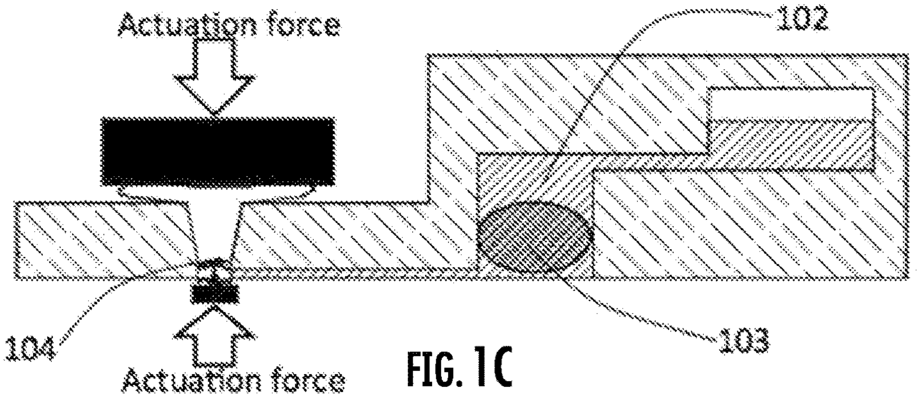

FIG. 1C is a cross sectional view of an exemplary microfluidic device with integrated Reagent Dispensing Unit (RDU) showing RDU after actuation.

Figure 2A:
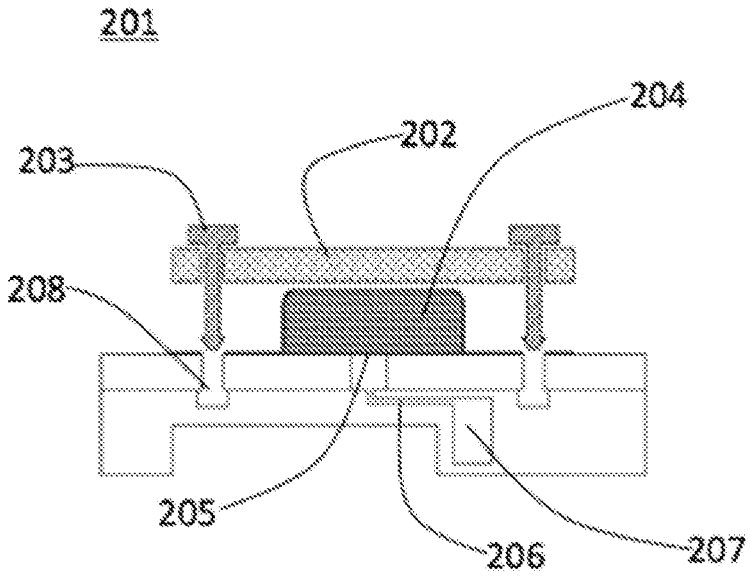

FIG. 2A is a cross sectional view of an exemplary microfluidic device with integrated RDU comprising a plunger and locking mechanism, before actuation.

Figure 2B:
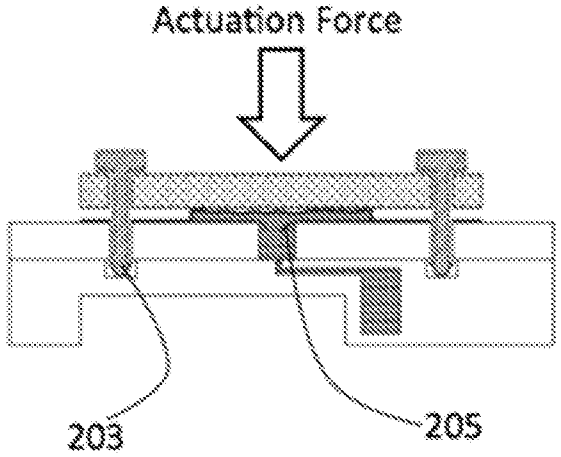

FIG. 2B is a cross sectional view of an exemplary microfluidic device with integrated RDU comprising a plunger and locking mechanism, after actuation.

Figure 3A:
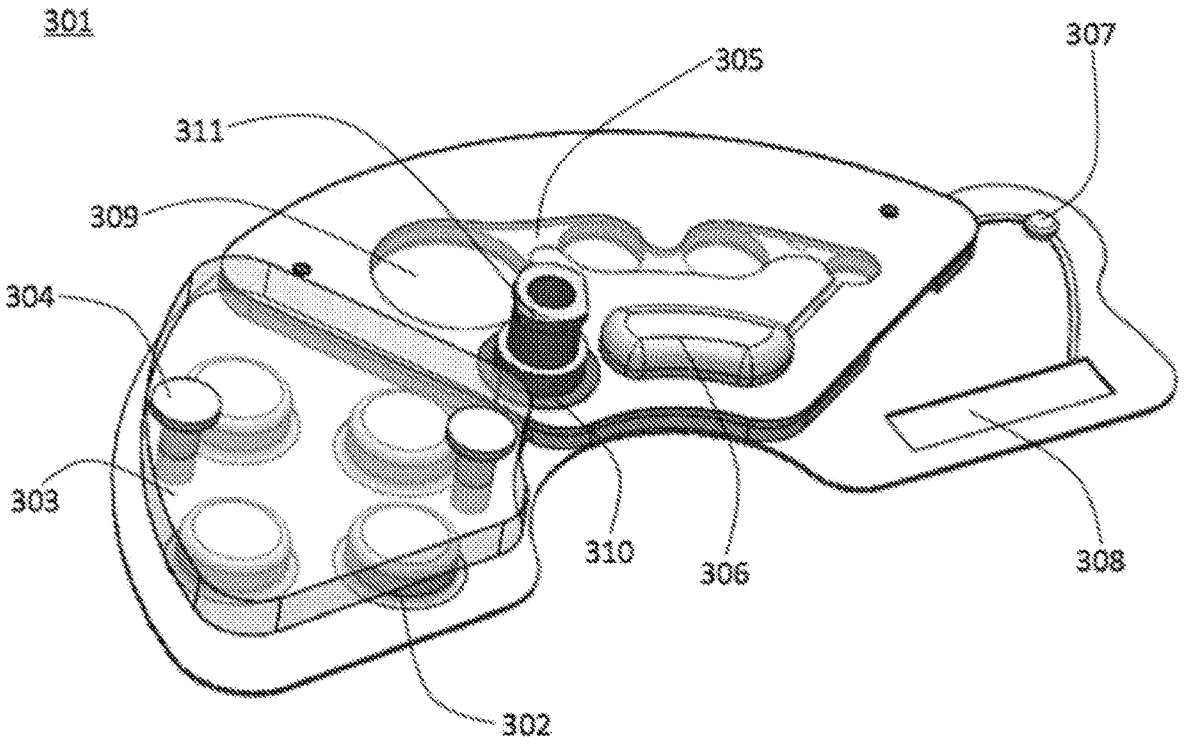

FIG. 3A is a perspective view of an exemplary sample-to-answer microfluidic cartridge for performing a nucleic acid amplification test (NAAT).

Figure 3B:
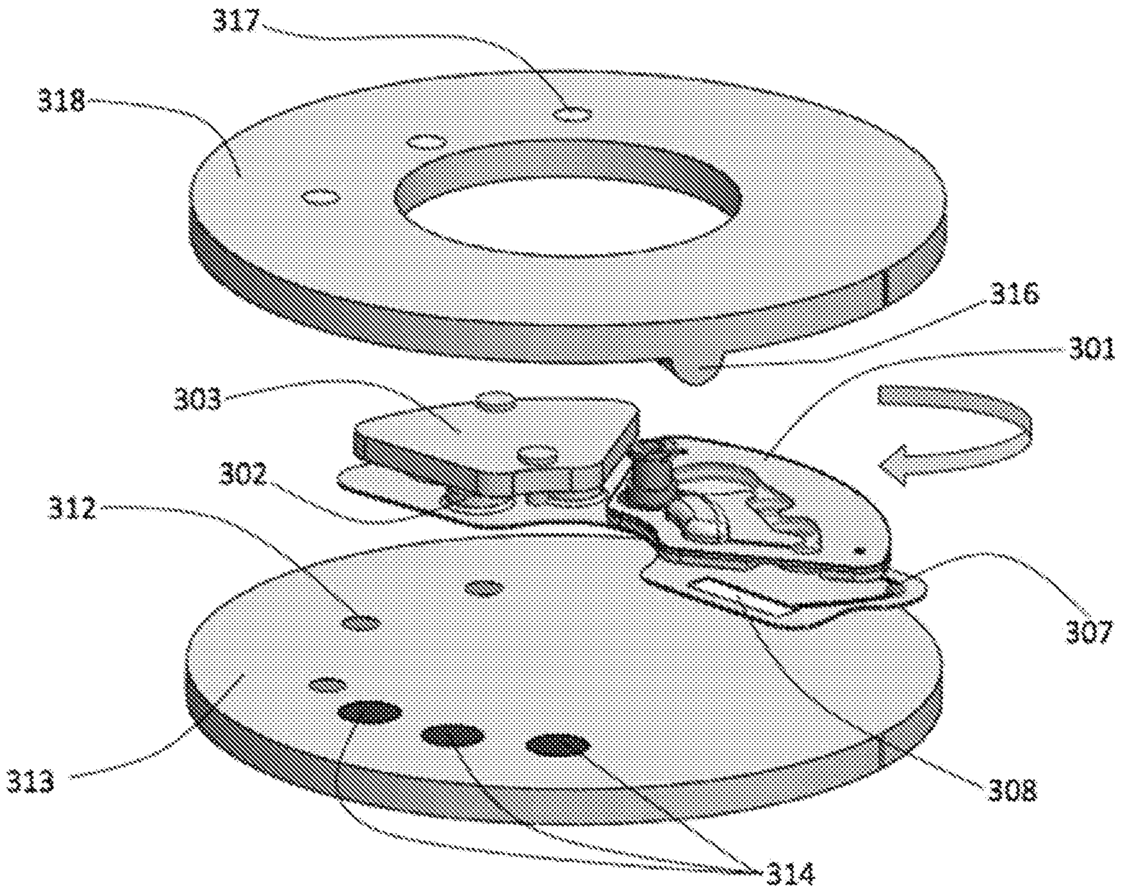

FIG. 3B is an exploded view of a schematic microfluidic device comprising a microfluidic cartridge that rotates in-between a top actuator element and bottom actuator element.

Figures 4A, 4B, 4C:
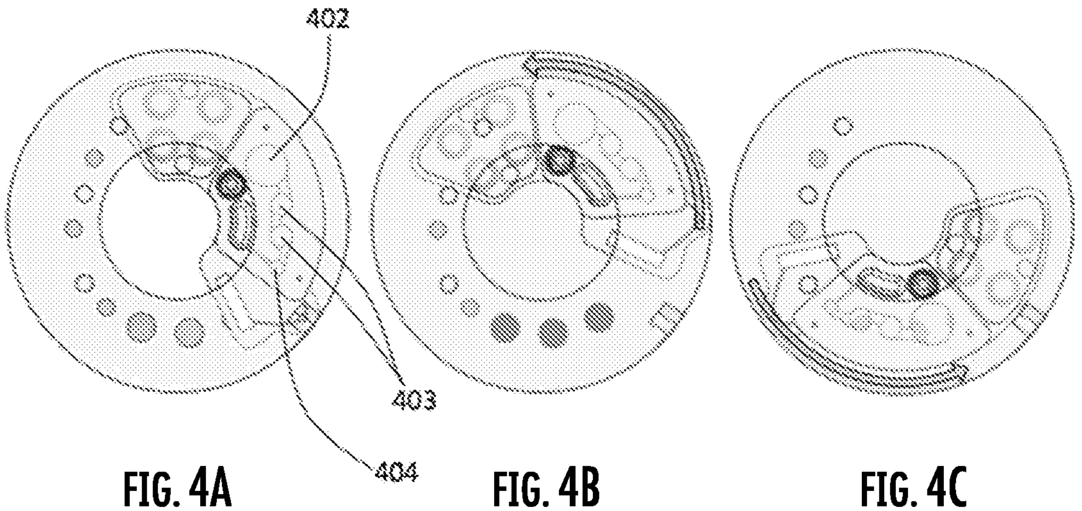

FIG. 4A is a top view schematic of the microfluidic device showing the position of the microfluidic cartridge with respect to the actuator elements, after the RDU was actuated.

FIG. 4B is a top view schematic of the microfluidic device showing the microfluidic cartridge position prior to the magnetic bead based sample preparation stage.

FIG. 4C is a top view of the microfluidic device showing the microfluidic cartridge position at the end of the magnetic bead based sample preparation, where the beads have been transported into the amplification well.

Figure 5A:
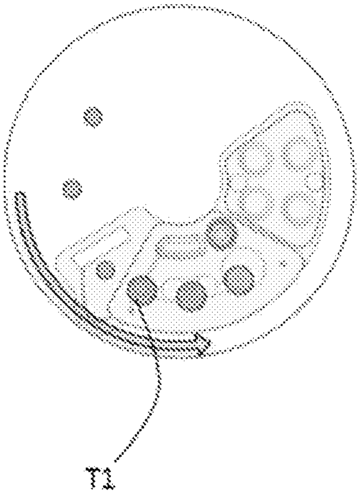
Figure 5B:
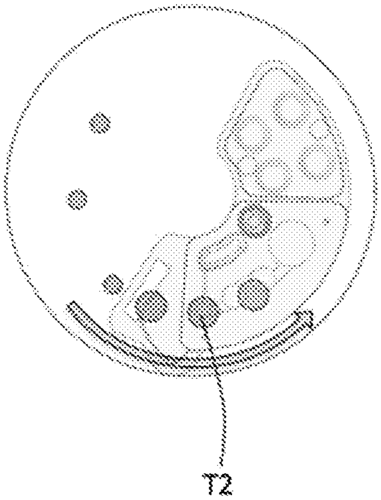
Figure 5C:
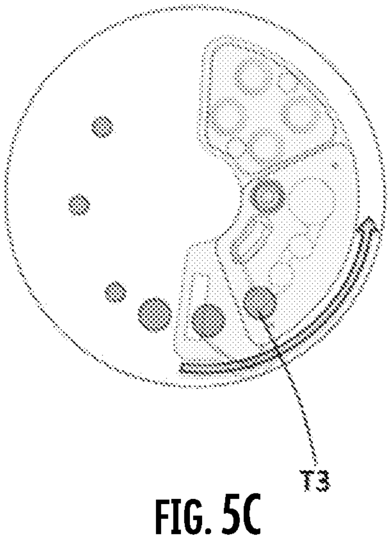

FIGS. 5A-5C illustrate a top view schematic of the microfluidic device showing the amplification well over three distinct heater elements on the bottom actuator element, with different temperature zones T1 (FIG. 5A), T2 (FIG. 5B) and T3 (FIG. 5C) so as to facilitate rapid thermal cycling through rotary position control.

Figure 6:
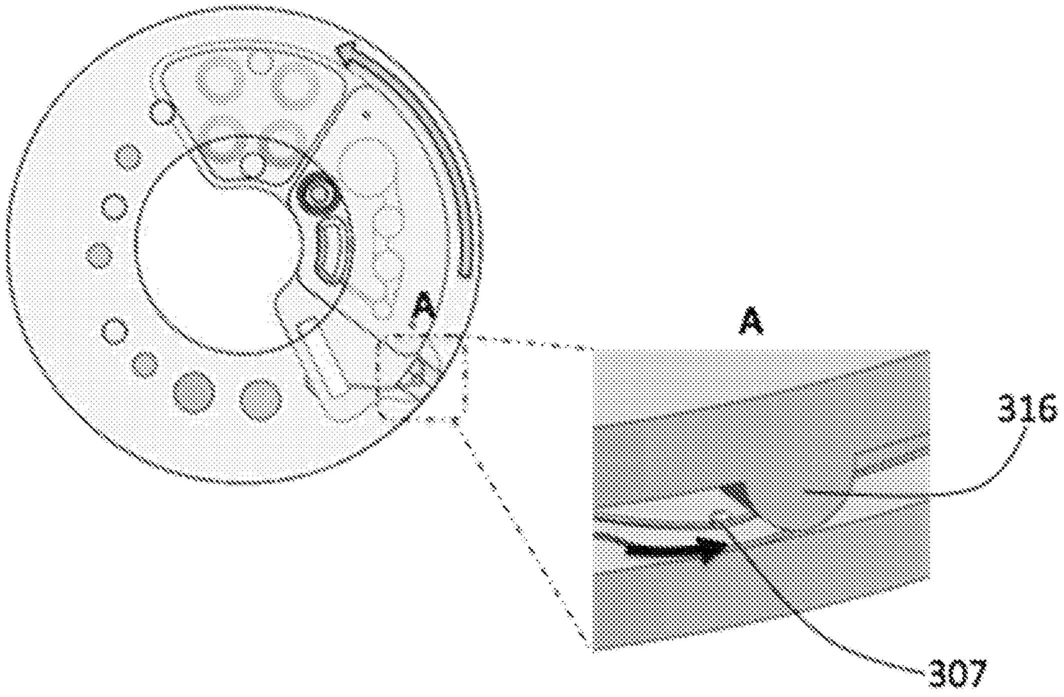

FIG. 6 is a top view of the microfluidic device showing the microfluidic cartridge position at the instant before actuation of the sharp object by the top actuating element, to facilitate wicking of the amplified product by the lateral flow strip for detection.

Figure 7A:
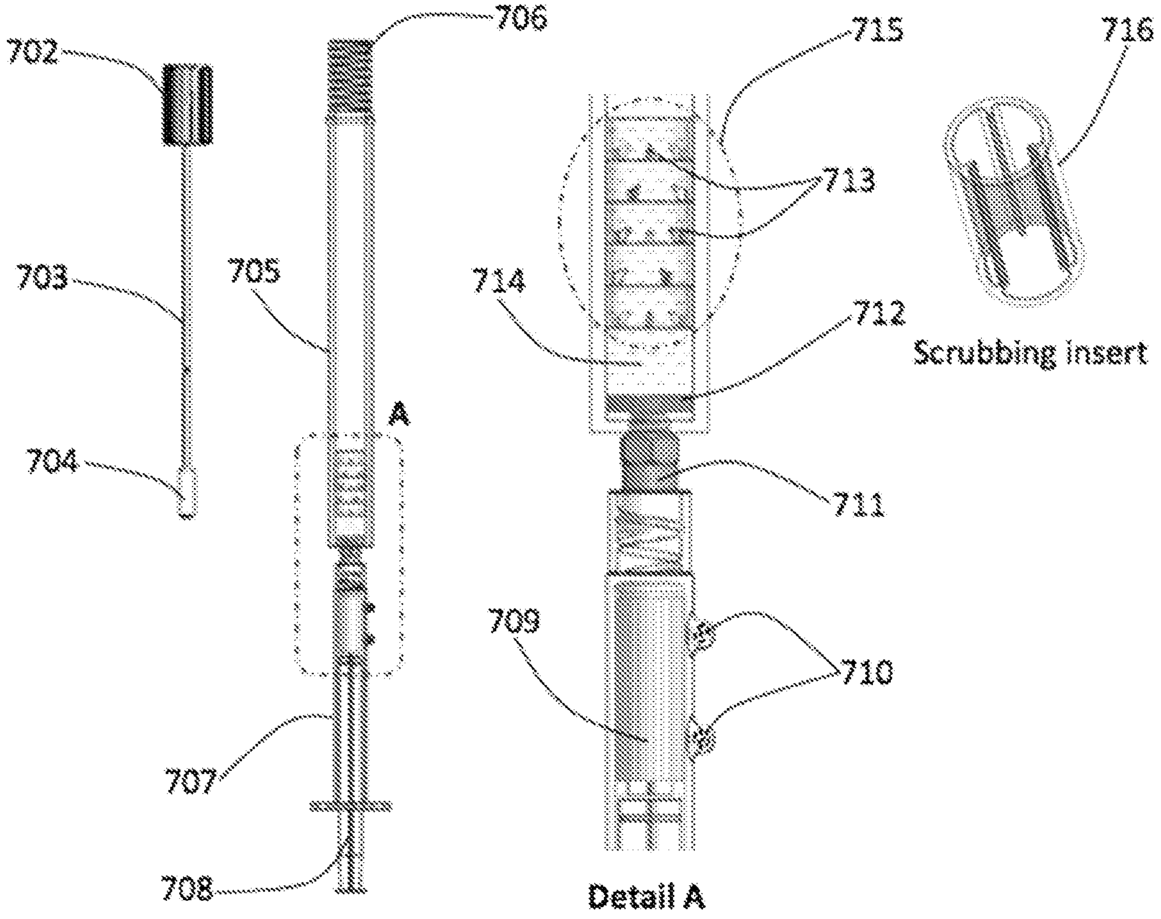

FIG. 7A is a schematic illustration of an exemplary sample extraction device for extracting and processing raw sample attached to a swab; showing different parts in the assembly.

Figure 7B:
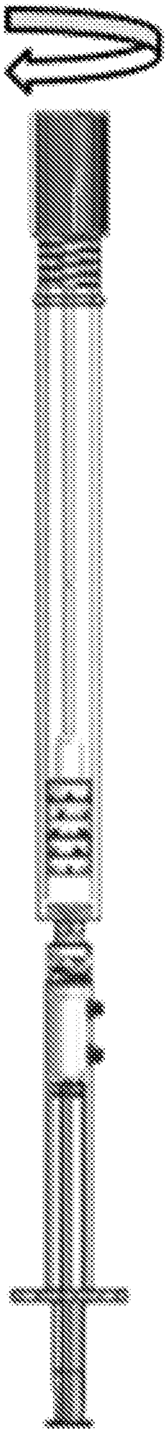

FIG. 7B is an assembled sample extraction device for processing raw sample attached to a swab, showing the swab rotating inside the scrubbing insert to facilitate mechanical scrubbing and squeezing of the swab head to maximize sample elution from the swab.

Figure 8:
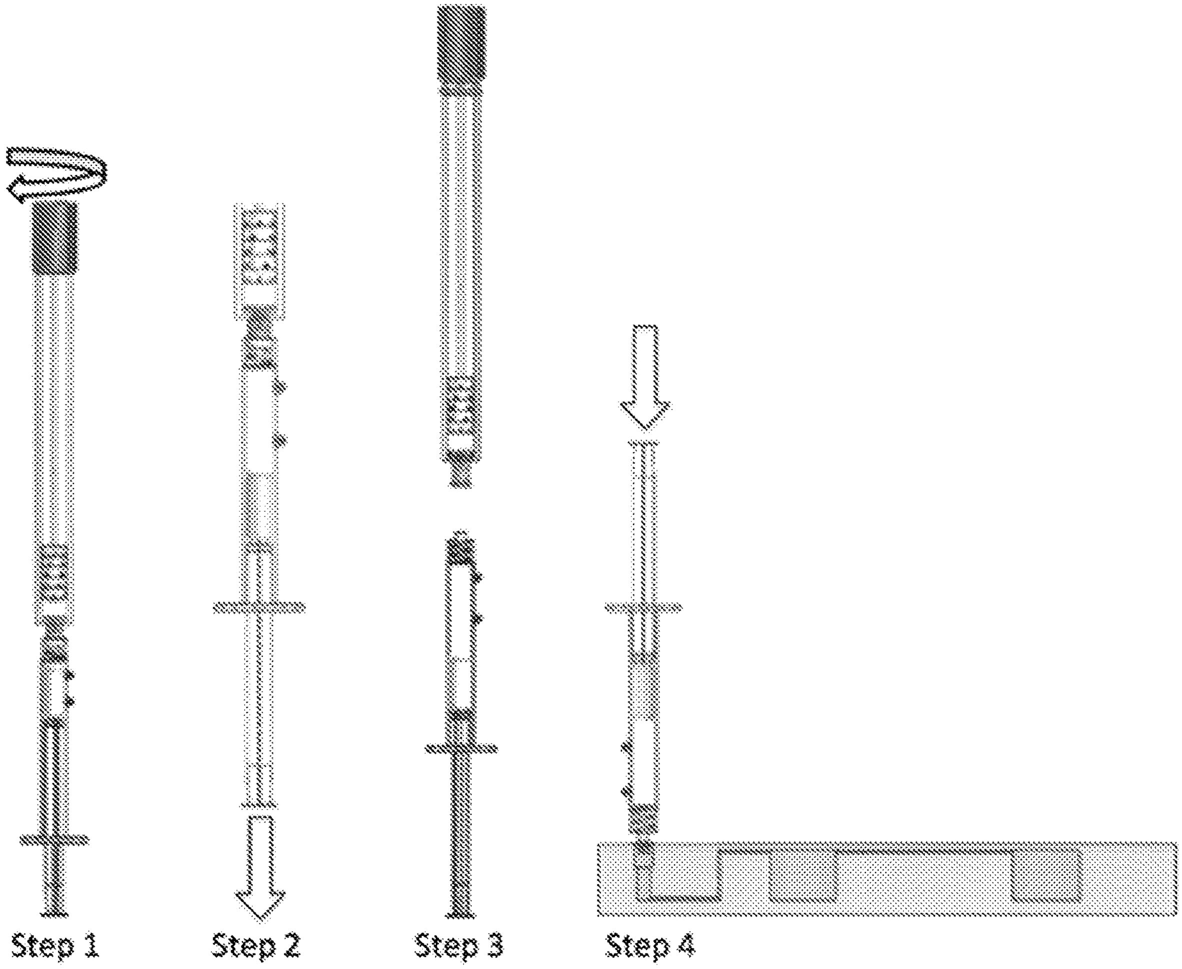

FIG. 8 is an illustration of the step by step sequence for performing an exemplary sample processing protocol for recovering raw sample attached to a swab and processing the eluent from the swab prior to transferring it to a microfluidic cartridge.

Figure 9A:
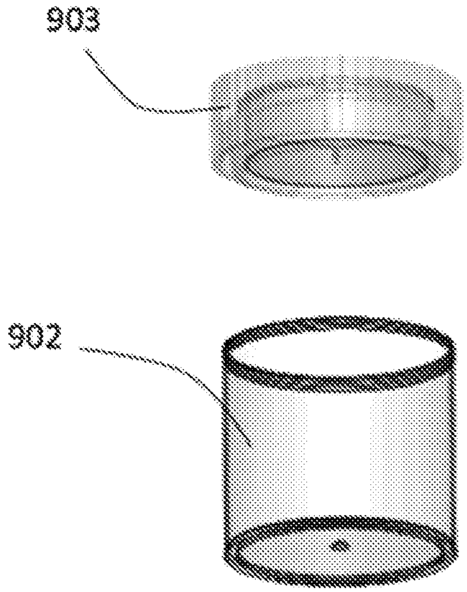
Figure 9B:
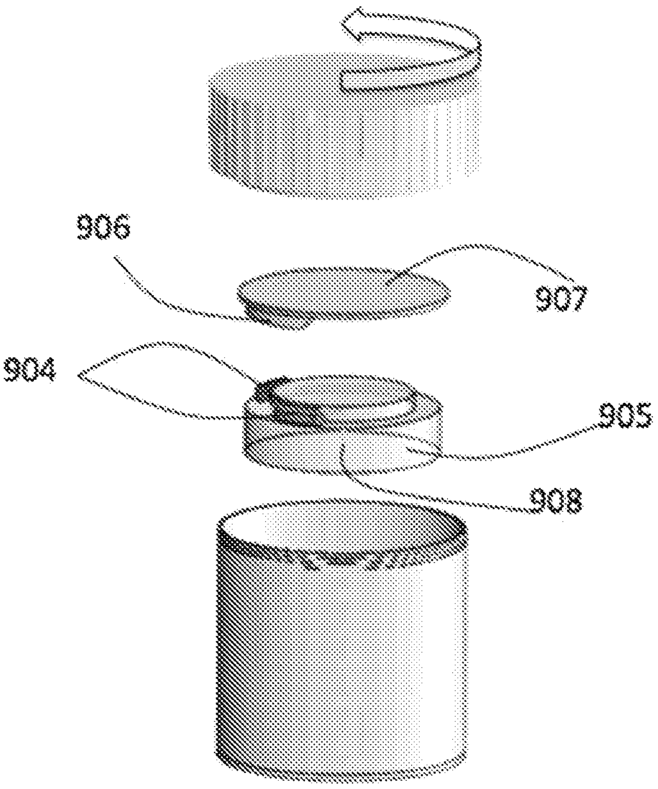

FIGS. 9A-9B illustrate an exemplary specimen processing unit with rotary actuator element, showing perspective views (FIG. 9A) and exploded views (FIG. 9B).

Figure 10A:
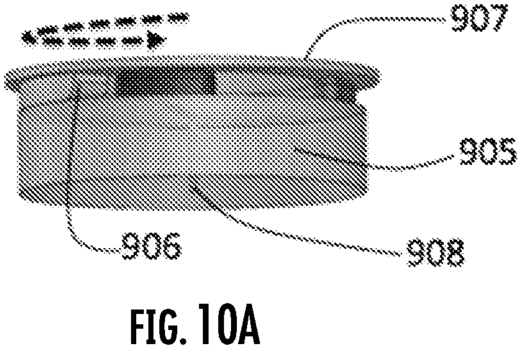
Figure 10B:
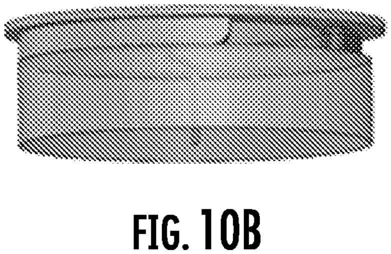
Figure 10C:
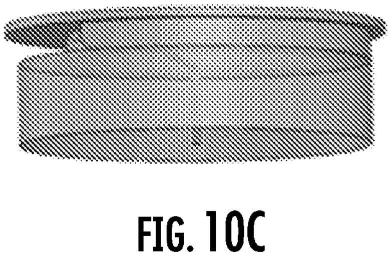

FIGS. 10A-10C show instances in the operating sequence as the rotary actuator element rotates relative to the reagent pallet in the specimen processing unit.

Figure 11:
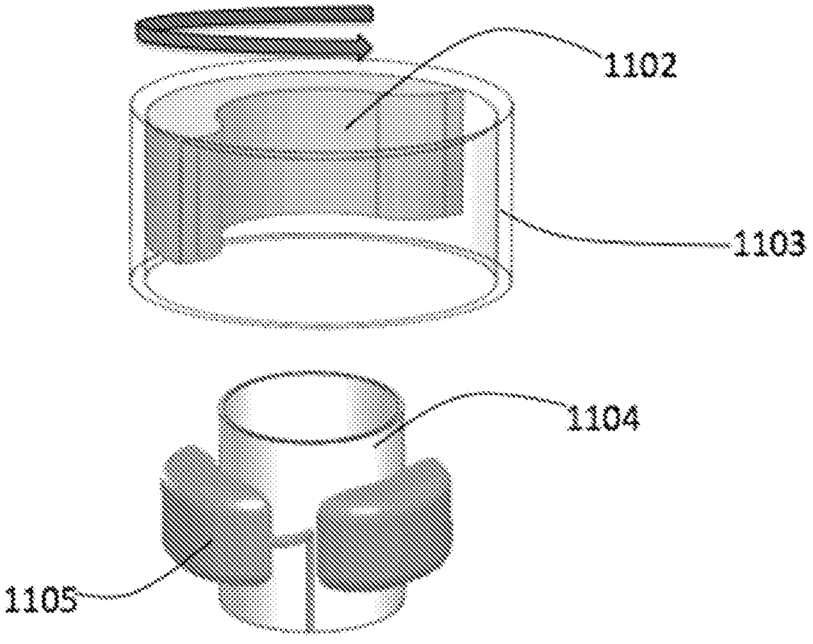

FIG. 11 shows exploded schematic of a rotary shaft based specimen processing unit.

Figure 12:
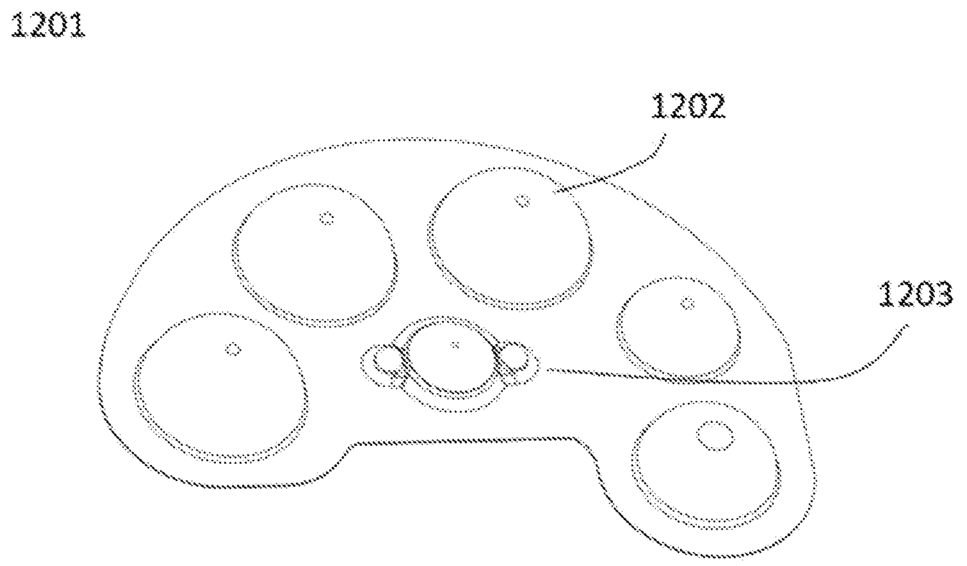

FIG. 12 is a Perspective view of an exemplary Reagent Pouch Card.

Figure 13:
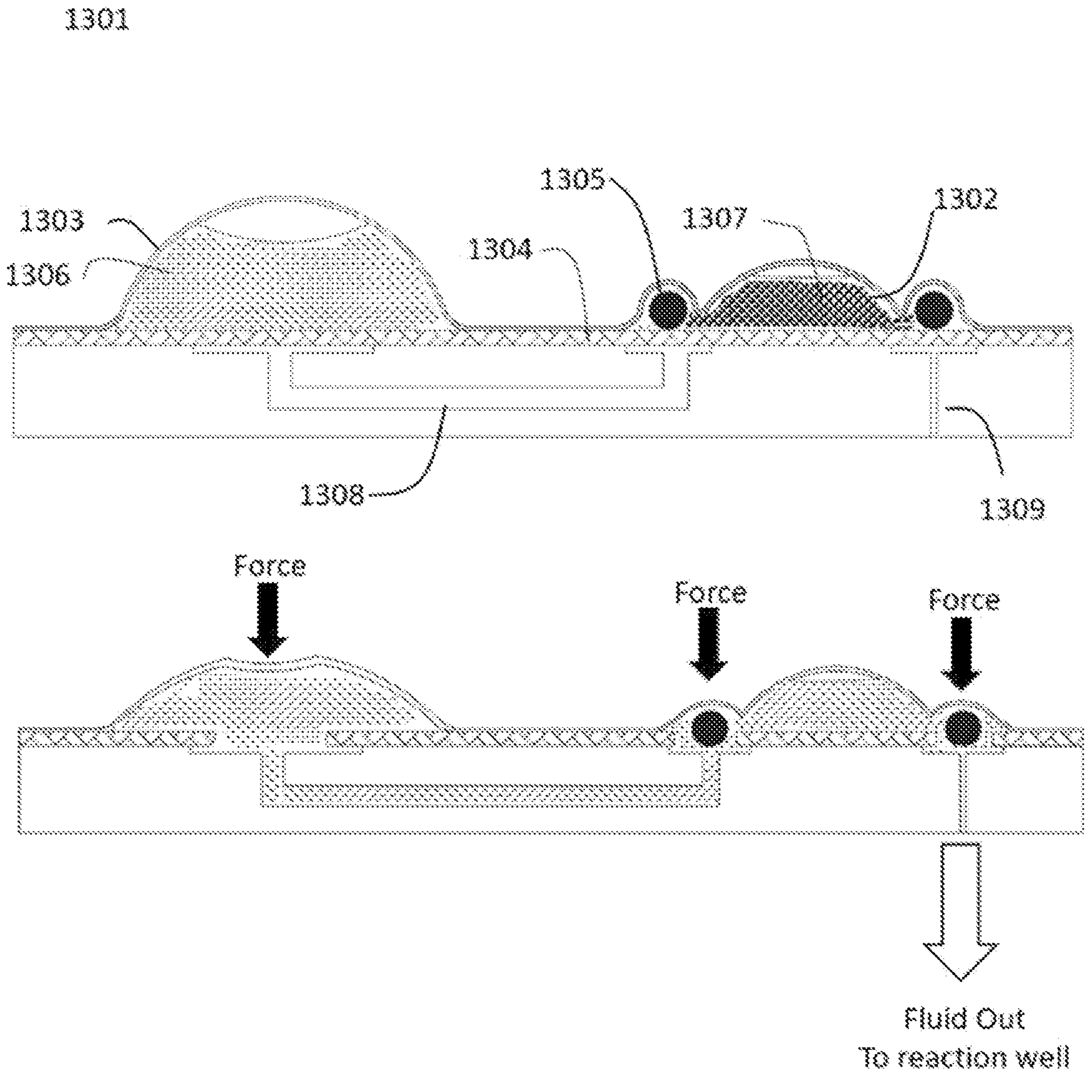

FIG. 13 is a cross-section schematic of an exemplary microfluidic device comprising reagent card comprising transfer reagent pouch and flow through reagent pouch before and after the application of actuation force.

Figure 14A:
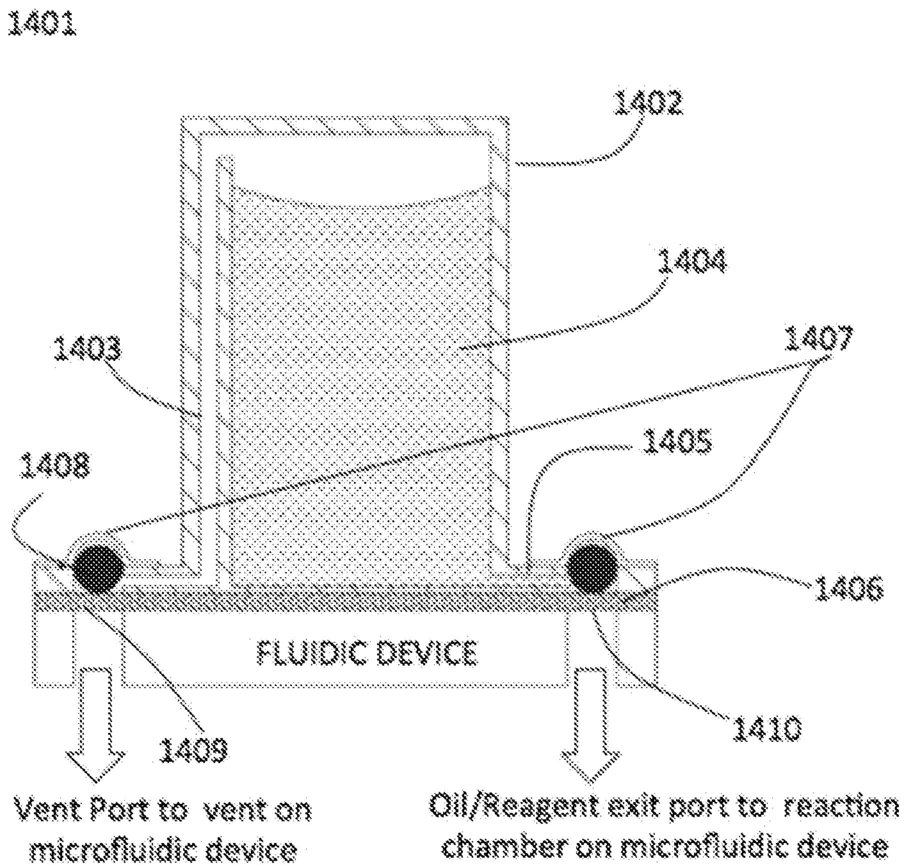
Figure 14B:
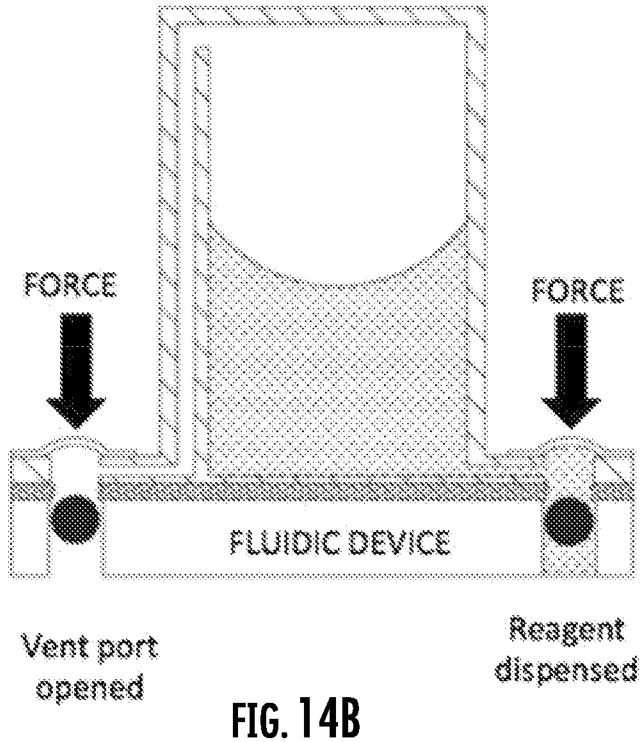

FIGS. 14A-14B is a cross section view of an exemplary microfluidic device showing oil/immiscible phase dispensing system prior to the application of the actuation force (FIG. 14A) and after the application of actuation force (FIG. 14B).

Figure 15:
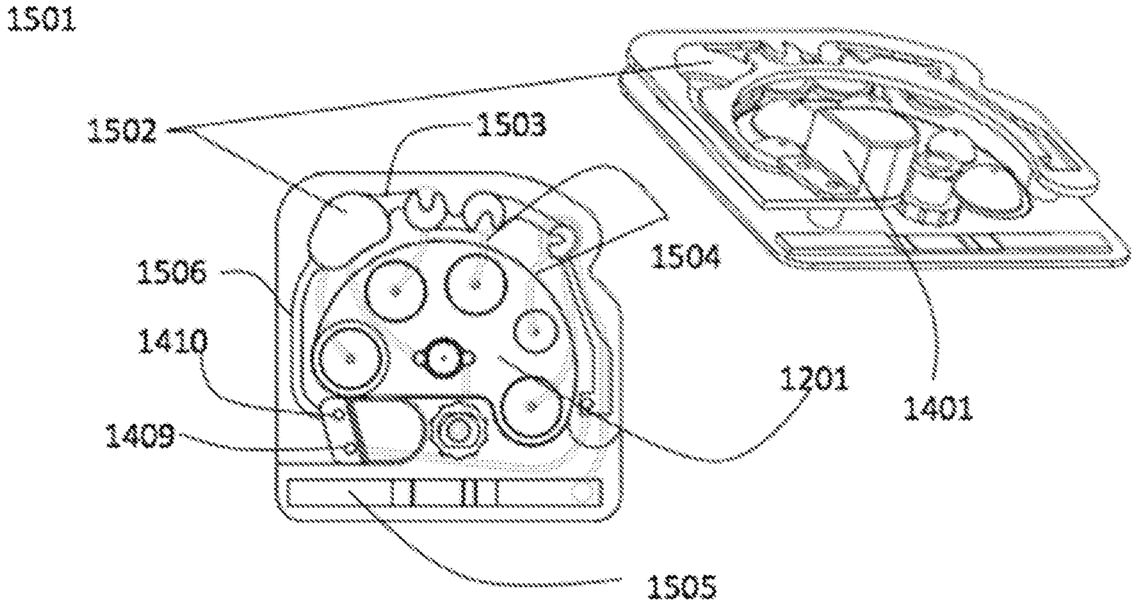

FIG. 15 is a top view and perspective view of an exemplary sample-to-answer microfluidic device for nucleic acid amplification tests (NAATs) with lateral flow based read-out.

DETAILED DESCRIPTION

The presently disclosed subject matter now will be described more fully hereinafter with reference to the accompanying Figures, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Figures. Therefore, it is to be understood that the presently disclosed subject matter is not to be limited to the specific embodiments disclosed and that modifications and other embodiments are intended to be included within the scope of the appended claims.

Automated Point-of-Care Devices for Complex Sample Processing and Methods of Use Thereof This invention relates to devices, assays, and methods for sample preparation, nucleic acid amplification and detection on an integrated sample to answer microfluidic device. The assay is designed to be simple for the end user to perform, with minimal hands-on time and equipment requirements. Typical manual sample preparation protocol involves multiple pipetting/fluid transfer and bead capture/resuspension steps for performing the binding, wash and elution cycles to yield purified DNA as the end product in a final volume of eluent.

Dead volume, which is volume retained in the reagent pouches, fluidic conduits/channels can greatly interfere with the repeatability and reliability of the assay performed on the cartridge. Particularly in assay steps that rely on a high pipetting accuracy to perform successfully; such as amplification steps where even small variations in the volume of the system can greatly affect the concentration of reagents and thereby the performance of the assay, and in steps where precise pH control is required, it is essential to have a metering system that can deliver accurate volumes of reagent to the desired reaction chamber. While it is possible to include reaction chambers that have a fixed volume capacity for metering the liquid reagents, such that any excess reagent delivered to the chamber overflows to waste, this type of system requires precision molding of the metering chamber for controlling the reagent dispensing accuracy on the microfluidic device. In addition, systems using metering chambers can be more prone to the effect of air bubbles in the system that can affect the reliability of fluid dispensing. As such additional de-bubbling mechanisms, pumps and valves may be required that add to the microfluidic cartridge and instrument complexity.

This disclosure describes a reagent dispensing unit (RDU) that overcomes the issues related to dead volume retained in microfluidic conduits and stored reagent pouches. This system efficiently delivers all the aqueous reagents required for accurately performing a microfluidic cartridge based assay, thus eliminating the need for sophisticated metering systems for metering precise volumes of aqueous reagent.

The reagent-dispensing unit comprises one or more reagent pouches comprising miscible and immiscible liquid reagents either in separate pouches or packaged together in a single pouch and one or more plungers that depress on the pouches so as to rupture the frangible sealing layer on the pouch and squeeze their contents out when sufficient actuation force is applied to them. In some embodiments the RDU may comprise a sharp object or protrusion that is capable of rupturing the frangible seal on the RDU when sufficient actuation force is applied to it. The sharp object or protrusion may be present in the pouch or in close proximity to the frangible seal of the RDU such that when actuation force is applied, the sharp object makes contact with the frangible seal thereby rupturing it.

Referring to FIG. 1, cross-sectional views of an exemplary microfluidic device with integrated Reagent Dispensing Unit (RDU) 101, showing filled reagent pouch (1A), RDU before actuation (1B) and RDU after actuation (1C) are shown.

The reagent pouch in the RDU (FIG. 1A) comprises an aqueous reagent 103 and a non-aqueous immiscible reagent 102 in a single reagent pouch that is sealed with a frangible seal layer 104 that can be ruptured upon actuation to enable reagent delivery into the microfluidic device. FIG. 1B depicts the RDU assembled on a microfluidic device 108. The RDU comprises a filled reagent pouch; and plunger elements 106, for squeezing the reagent pouch and for actuating a sharp object 105 that is used to rupture the frangible seal layer 104 assembled on a microfluidic device. The RDU is integrated into the microfluidic device 108 such that the frangible seal 104 is present at the interface of the inlet conduit 107 into the fluidic reagent well 109 on the microfluidic device. The microfluidic device comprises one or more reagent wells 109 and a waste well 110 that aids in collecting the excess immiscible reagent 102 that overflows out of the reagent wells 109.

The immiscible reagent is selected such that when the device is in operation, the aqueous reagent is closest to the interface between the frangible seal and the inlet conduit of the fluidic well. In some embodiments immiscible fluids that are less dense than the aqueous reagent, such as mineral oil and the like may be employed in the system; such that they float and form an immiscible layer on top of the aqueous reagent. In other embodiments, immiscible fluids that are denser than the aqueous reagent, e.g. fluorocarbon based compounds such as fluorinert (3M), may be used such that the less dense aqueous reagent floats on the top of the immiscible fluorinert fluid. The immiscible non-aqueous fluid is selected such that when the device is placed in its operating position, the aqueous reagent is closest to the interface between the frangible seal and the inlet conduit of the fluidic well.

FIG. 1C depicts the actuated RDU assembled on the microfluidic device 108. When actuation force is applied to the device, the integrated plungers squeeze the reagent pouch so as to rupture the frangible seal 104, thereby making fluidic connection with the reagent well 109 through the inlet fluidic conduit 107. Referring to FIG. 1C, the aqueous fluid 103 being closest to the inlet fluidic conduit 107 first flows out of the inlet conduit and into the fluidic well; followed by the non-aqueous immiscible fluid 102 which functions to effectively push out all the aqueous reagent that would have otherwise occupied the dead volume space in the fluidic conduits and RDU. Excess immiscible non-aqueous fluid 102 overflows out of the reagent well into a waste well 110 where it is collected. This system may be used to effectively deliver precise amounts of aqueous reagents on the microfluidic device while eliminating dead volume issues by filling the spaces with a non-reactive immiscible, non-aqueous fluid. The non-aqueous immiscible fluid 102 also forms a barrier on top of the aqueous fluid in the fluidic well, and operates to prevent evaporation of the aqueous reagent during heating steps such as thermocycling or heat incubation. Such a type of system does not require the use of complex valves or pumps for proper operation, thereby greatly reducing system complexity. Additionally, precision molding of the reaction chambers, that is typically required for metering accurate volumes of reagents is not required since the system does not rely on the volume of the reaction chamber for metering accurate volumes. Rather, the aqueous reagent that is pre-filled into the RDU using well known precision pipetting processes along with the immiscible non-aqueous fluid is completely delivered to the desired fluidic well upon actuation, due to the presence of the non-aqueous immiscible fluid that pushes out the aqueous reagent completely and occupies all the dead spaces that would be filled with aqueous reagent. The volume of immiscible reagent dispensed into the system is not critical and does not require precise delivery. Hence a main advantage of this type of system is that it does not require precise actuation control on the instrument to ensure run-to-run repeatability with aqueous reagent delivery from single dose reagent packs, since once all the aqueous reagent is filled into the device the immiscible non-aqueous fluid overflows and ensures that the aqueous reagent is completely delivered to the desired fluidic well by pushing out the aqueous reagent and occupying all the dead spaces. pushes out all the aqueous reagent from the RDU and ensures that it is successfully delivered into the microfluidic system during actuation.

In some embodiments the RDU may include a locking mechanism that functions to lock the plunger element in its depressed position so as to prevent backflow of reagents into the reagent pouch. This locking mechanism is not limited to a pin capture mechanism such as a ball lock pin, rivet, barb pin and the like.

Referring to FIGS. 2A and 2B, cross sectional views of an exemplary microfluidic device with integrated RDU comprising a plunger and locking mechanism 201, before and after actuation respectively are shown. The plunger element 202 is assembled in proximity to the reagent pouch 204. The plunger element is secured in place with barbed pins 203 which are trapped inside a locking bore 208 and oriented so as to restrict the motion of the plunger to a direction that facilitates the depressing of the pouches during the application of actuation force. In this exemplary embodiment the trapped barbed pin 203 is only able to move in the downwards direction along the locking bore 208 situated on the microfluidic device. The reagent pouch comprises a frangible seal layer 205 that is ruptured when sufficient actuation force is applied to the plunger as depicted in FIG. 2B. Upon actuation the frangible seal 205 is ruptured and the contents of the reagent pouch 204 are transferred to the fluidic well 207 through the inlet fluidic conduit 206 on the microfluidic device. The barbed pins 203 move down into the locking bore 208 and lock the plunger in its depressed position so as to prevent backflow of the reagents into the reagent pouch.

One aspect of the present invention is a microfluidic device comprising two or more fluidic wells that are connected to each other through a primary channel. The fluidic wells are connected to one or more reagent dispensing units (RDU) comprising stored liquid reagents that are separated from the inlet into the fluidic well by a frangible seal. The reagent pouches may be filled with aqueous fluid, non-aqueous immiscible fluid or a combination thereof. Upon actuation, the frangible seal is ruptured and the contents of the reagent dispensing unit are transferred to the fluidic well. At the end of a RDU actuation sequence, the stored reagents are successfully transferred into the fluidic wells on the microfluidic device. The fluidic wells will be filled with their respective aqueous reagents and connected to each other through a primary channel filled with a non-aqueous fluid.

For point of care settings, self-contained systems are advantageous since they do not require any complex, user driven pipetting or injection steps. In one exemplary embodiment, reagents may be stored on the fluidic device in reagent pouches. Pouch reagents include but are not limited to buffers, salts, acids, bases, labels, tags, markers, water, alcohols, solvents, waxes, oils, gases, gels, and the like. When sufficient pressure is applied on the pouch it bursts, thereby dispensing the contents of the pouch into the fluid conduits that lead to their intended reaction well. The pouches are designed with frangible seals aligned with the inlet of the fluidic conduit such that when the pouch bursts, its contents are forced to enter the fluid conduit and fill the fluidic well.

Each fluidic well volume is so designed such that it may be only partially filled with miscible liquid reagents so as to not allow the miscible liquids in each fluidic well to overflow and mix with each other through the top fluidic conduit of each fluidic well. The reagent pouches containing immiscible liquids such as mineral oil are connected to the primary fluidic conduit such that upon actuation: 1) the contents of the reagent pouches containing the immiscible liquids get released to form immiscible oil phases over the aqueous reagents filled in the fluidic wells, and 2) all the miscible liquids in the fluidic wells are connected in a sequence to form a fluidic circuit, but separated from each other by an oil phase to avoid mixing with each other. The primary fluidic conduit exits into a waste well to collect excess oil.

While it is possible to pre-fill the fluidic wells with buffers separated by an oil phase, seal and store the cartridge for later use, some reagents not limited to enzymes, oligos, dNTPs and buffers are not stable in their liquid form at room temperature or for long periods of time, and thus need to be stored in lyophilized format and hydrated before use. Additionally, there presents a challenge with introducing the sample into a such a pre-filled system. The disclosed invention provides a method and device to address the challenges related to sample introduction, reagent delivery and assay automation for sample processing on a microfluidic device.

Now referring to FIG. 3A a perspective view of an exemplary sample-to-answer microfluidic cartridge 301 for performing a nucleic acid amplification test (NAAT) is shown. The sample-to-answer microfluidic cartridge comprises one or more reagent wells 309 that are connected to each other through a primary fluidic channel 305. The RDU that is assembled to the microfluidic cartridge comprises a plurality of reagent pouches 302 that are separated from the inlet conduits to the fluidic wells 309 on the microfluidic cartridge by a frangible seal; and an integrated plunger element 303 with locking pins 304 that lock the plunger in its depressed position after actuation, so as to prevent backflow of the reagents into the reagent pouch. In this embodiment the plunger element 303 is so designed as to come in contact with all the reagent pouches at the same instant so as to depress and release all the individual reagents from the reagent pouches in parallel from a single actuation step. In other embodiments the plunger element may comprise spatially oriented protrusions on it with varying depths so as to make contact with a desired reagent pouch in a preferred sequence so as to facilitate sequential reagent delivery into the microfluidic cartridge as the plunger is depressed. Upon actuation of the RDU, the reagent wells are filled with aqueous reagents and the fluidic circuit between the reagent wells is completed through the primary fluidic channel that is filled with non-aqueous immiscible fluid. The cartridge comprises a waste well 306 which traps the excess immiscible reagent that overflows out of the reagent wells 309 through the primary fluidic channel 305. For performing a NAAT, the reagent pouches may comprise lysis buffers, binding buffer, magnetic beads, wash buffers, hydration buffer, and immiscible fluids such as mineral oil, waxes or fluorocarbon based compounds such as fluorinert.

The reagents and reagent delivery sequence may be designed differently depending on the type of assay that is being automated on the microfluidic device. The cartridge may also comprise dried down reagents and lyophilized reagents that may be hydrated during use by either the sample or dispensed buffer. The cartridge comprises a sample inlet port through which the sample is transferred into the cartridge for processing. The sample inlet port may comprise a quick connect fitting such as a luer 311 through which the sample may be injected into the cartridge. Other embodiments may include an access port through which sample may be pipetted into the cartridge.

In some embodiments the cartridge comprises one or more filter membranes 310 at the interface between the inlet port and cartridge such that impurities and inhibitors from the sample are filtered out prior to sample delivery into the cartridge. The filter membrane material and pore size may be chosen depending on the type of assay being performed and are not limited to nitrocellulose, nylon, PTFE, PES, glass fiber, PVDF, MCE, polycarbonate and the like. Depending on the type of detection method employed, the cartridge may comprise additional downstream analysis units such as DNA hybridization microarrays, protein arrays, lateral flow strips and the like.

In some embodiments fluorescence, electrochemical or colorimetric based detection technologies may be used for detecting the amplified products. In the exemplary microfluidic cartridge depicted in FIGS. 3A-3B, colorimetric detection is employed using a lateral flow strip 308 that may be read either digitally through an optical read-out or visually by the end user. The lateral flow strip is separated from the amplification well by a frangible seal layer that is coupled with a pouch containing a sharp object 307, that can rupture the frangible seal upon actuation to deliver the amplified product to the lateral flow strip 308 for detection. In some embodiments the amplification well itself may contain a frangible layer and may be easily deformed upon actuation such that the frangible seal layer is ruptured and the amplified product is squeezed onto the lateral flow strip.

Now referring to FIG. 3B, an exploded view of a schematic microfluidic device comprising microfluidic cartridge 301 that rotates in-between a top actuator element 318 and bottom actuator element 313 is shown.

The top and bottom actuator elements comprise spatially oriented magnets 317 and 312 respectively such that in a single actuation step comprising rotating the microfluidic cartridge between the actuator elements, the spatially oriented magnets capture, re-suspend and transport the magnetic beads between the different reagent wells so as to perform a sample preparation sequence such as a bind, wash, elute sequence on the sample that is transferred into the microfluidic cartridge. In the exemplary embodiment depicted in FIG. 3B the top actuator element comprises protrusions 316 that are designed to make contact with the microfluidic cartridge at a predefined time in the assay sequence and actuate a sharp object in a pouch 307 present on it so as to rupture a frangible seal layer and introduce the amplified product to the lateral flow strip 308. The bottom actuator element comprises one or more spatially oriented heater elements 314 that assist in providing stable single temperature heat or thermal cycling that is necessary for isothermal or PCR based amplification respectively of nucleic acids. The spatially oriented heater elements 314 may also assist in providing heat for sample preparation steps or for downstream post-amplification steps depending on the assay that is being performed on the system. In the case where thermal cycling is performed, the microfluidic cartridge rotates in a cyclical fashion between the three heater elements that are set to constant single temperatures such that the amplification well is in contact or close proximity with the desired heater element for the desired amount of cycling time.

Sample-to-Answer NAAT: An exemplary sample-to-answer NAAT is described herein on the microfluidic assay automation platform using a single actuator providing rotational motion such as a servomotor or stepper motor, wind-up spring, hand crank or user generated finger actuation. Wind-up spring mechanisms offer the ability to automate the assay using no electric/battery power which is an advantage especially for applications in low resource settings. However, motors such as servomotors and stepper motors are inexpensive and offer more control over the system operation. The system can be configured to incorporate different methods and steps depending on the type of assay and assay operation sequence.

Chargeswitch® technology (Invitrogen) is an extremely simple and effective method for purifying nucleic acids. It employs a unique ionizable coating that can be covalently affixed to solid phase supports such as magnetic or nonmagnetic beads, membranes, or even plastic tubes and plates. The charge of the ionizable coating is switchable by changing the pH of the surrounding buffer. At low pH, the surface is positively charged and allows negatively charged nucleic acids to bind to the solid phase support while proteins and other contaminants can be easily washed away. At higher pH the charge on the surface is neutralized and nucleic acids are eluted from the surface without the need for performing time consuming precipitation steps. A unique advantage is that chargeswitch technology employs aqueous buffers and does not require the use of ethanol, chaotropic salts or organic solvents which can inhibit downstream applications such as amplification.

Magnetic beads are a very effective and simple solid phase capture support for nucleic acid extraction and purification. Magnetic bead based DNA purification does not rely on centrifuges and can be easily automated to reduce hands-on time. They are the method of choice when rapid purification is necessary are a Magnetic DNA purification is a clear improvement upon centrifuge-dependent isolation techniques when semi-automatic or fully automatic systems are considered. These systems are used when rapid purification of many samples is necessary. Magnetic beads coated with an ionizable (switchable) coating can be used to rapidly and efficiently purify nucleic acids from raw biological samples. Described herein is a unique assay automation platform that enables magnetic beads to be captured, re-suspended and transferred across a series of reagent filled chambers through an oil-filled primary fluidic conduit in a single rotational motion. Using this platform nucleic acids can be extracted and purified from raw biological samples in a two-minute sequence.

The microfluidic cartridge comprises reagent pouches comprising aqueous reagents such as binding buffer, magnetic beads in suspension, wash buffer, hydration buffer and non-aqueous mineral oil as an overlay and transport fluid. The microfluidic cartridge also comprises dried down and lyophilized reagents such as dried down lysis buffer reagent and lyophilized amplification mix that are present in the respective reagent wells. When the test is ready to be run the following steps are performed:

1. Raw biological sample is pipetted, dropped or injected into the cartridge through the sample inlet port.
2. Cartridge is inserted into hand-held instrument comprising actuator elements, motor, electronics and display.
3. Lid of the instrument is closed and test is started.

System operation: The system can be configured to incorporate different methods and steps depending on the type of assay, biological sample and sample processing steps required for the sample; and assay operation sequence. As an illustrative example, the operation sequence for performing a NAAT on a swab sample such as a urogenital swab or buccal swab is described. The swab is expressed in a buffer to extract the cells from the collected swab sample. The sample is then transferred into the microfluidic cartridge where it hydrates the dried down lysis buffer reagent present in the lysis/binding well 402. The cells in the raw sample are lysed. The lid of the instrument is then closed. In this embodiment the closing of the lid provides the actuation force that causes the plunger 303 to be depressed and reagents from the stored reagent pouches to be dispensed into their respective wells. During successful operation the magnetic beads in suspension and binding buffer are dispensed into the lysis/binding well containing the raw sample lysate; wash buffers are dispensed into wash wells 403; hydration buffer is dispensed into the amplification well 404 containing the lyophilized amplification mix and mineral oil is dispensed to form a continuous overlay over the wells, filling up the primary fluidic channel 305 and completing the fluidic circuit. The locking barb pins present on the cartridge keep the plunger element on the microfluidic cartridge in its depressed position so as to prevent backflow and to prevent it from hindering the smooth rotation of the microfluidic cartridge in between the actuator elements.

Referring to FIG. 4A, the top view of the microfluidic device showing the microfluidic cartridge position after the RDU was actuated is shown. Following the reagent loading step, the microfluidic cartridge begins to rotate in close proximity to the top and bottom actuator elements as shown in FIG. 4B. As the cartridge rotates, the spatially oriented magnets present on the top and bottom actuator elements work to capture, re-suspend and transport the magnetic beads through the different reagent filled wells. The nucleic acids bind to the magnetic beads in the presence of the binding buffer which alters the pH of the solution surrounding the beads to <pH 6. The magnetic beads are then captured by the first permanent magnet on the top actuator element and moved through the primary channel and transported into the first wash well. The primary channel comprises obstacles that prevent the beads from freely moving under the influence of the magnetic field and trap the beads in the desired well. The beads that have been trapped on the top surface of the wash well in the oil phase come under the influence of a second permanent magnet on the bottom actuator element that pulls them down from the oil phase into the aqueous phase of the wash buffer reagent. This pulling magnetic force on the beads effectively re-suspends them in the wash buffer (pH 7) present in the second well. As the microfluidic cartridge continues to rotate, this sequence of capture, transport and re-suspend on the beads continues to occur, effectively purifying the nucleic acids from proteins and inhibitors present in the sample. The entire sequence from binding to elution can be completed in 2 minutes using the described assay automation platform. At the end of the sample preparation stage, the beads are transported and re-suspended into the amplification well 404 comprising hydrated amplification mix. The pH of the amplification mix being ~8.5 neutralizes the charge on the magnetic beads thereby directly eluting all the purified nucleic acids into the amplification mix. FIG. 4C depicts the schematic of the top view of the microfluidic device showing the cartridge position at the end of the sample preparation stage.

During the amplification stage, the cartridge rotates to a position where the amplification well is in close proximity to the spatially oriented heater elements 314 on the actuator element. The heater elements function to provide the heat energy required for nucleic acid amplification. For isothermal amplification reactions that require incubation at a single temperature, the additional heater elements are not utilized and a single heater element is capable of delivering the heat energy for amplification. For applications involving polymerase chain reaction (PCR) where thermal cycling that is necessary, the microfluidic cartridge rotates in a cyclical fashion between the three heater elements that are set to constant single temperatures such that the amplification well is in contact or close proximity with the desired heater element for the desired amount of cycling time.

Referring to FIGS. 5A-5C, a top view schematic of the microfluidic device (top actuator element not depicted) is shown with amplification well 404 positioned over heater element set to temperature T1 in FIG. 5A; T2 in FIG. 5B and T3 in FIG. 5C. This illustrates how a sample-to-answer NAAT with rapid thermal cycling can be achieved using three fixed heat zones on the actuator element and switching/actuating the microfluidic cartridge in a precise timing sequence using the single motor that is also used to perform the entire assay automation sequence. The motor rotates back and forth between the three heat zones, thereby cycling the amplification chamber between the three heat zones set at temperatures corresponding to denaturing, extension and annealing cycles. This continues until the predefined number of cycles is complete. In some embodiments rapid two temperature PCR may be performed using only two of the three heater elements. In some embodiments the heater element comprising a custom aluminum block with an integrated resistive element may be used as a heat sink to facilitate rapid cooling of the reaction to the desired temperature. In some embodiments the heater elements may also assist in providing heat for sample preparation steps or for downstream post-amplification steps such as DNA hybridization on a microarray, depending on the assay that is being performed on the system.

Following the amplification stage, detection of the amplified products is performed colorimetrically on an integrated lateral flow strip. The lateral flow strip is separated from the amplification well containing the amplified product by a frangible seal layer that is coupled with a pouch containing a sharp object 307, that can rupture the frangible seal upon actuation to deliver the amplified product to the lateral flow strip 308 for detection. In some embodiments the amplification well itself may contain a frangible layer and may be easily deformed upon actuation such that the frangible seal layer is ruptured and the amplified product is squeezed onto the lateral flow strip.

Referring to FIG. 6, a top view of the microfluidic device is shown at the instant when it comes into position for the detection step on the lateral flow. A is a magnified image depicting the protrusion 316 coming in contact and deforming the pouch containing sharp object 307 to rupture the frangible seal layer. The top actuator element comprises spatially oriented protrusions 316 on it that squeeze and deform the pouch containing a sharp object 307 as the microfluidic cartridge rotates to come in contact with the protrusion. This deforming force causes the frangible seal layer to rupture and thereby causes the amplified product to be wicked through the lateral flow strip.

Sample Collection and Extraction Devices: Swabs are largely used as biological sample collection devices. While swabs such as the COPAN FLOQSwabs™ are engineered such that the entire sample stays close to the surface for fast and complete elution, physical forces need to be used to maximize the elution of the sample into the transfer medium or buffer. Typically, manual agitation by vigorously twirling the swab in the transport medium or vortexing is used in laboratories to maximize the elution of the sample from the swab into solution. The swab is manually expressed and the solution containing the sample is then pipetted out and processed further depending on the type of assay.

In Point-of-Care ("POC") and low resource settings, vortexing samples is not a convenient method for eluting samples in liquid medium and manual shaking or twirling can result in operator to operator inconsistencies. Moreover, since swabs are absorbent, a finite amount of sample in solution is lost as it remains on the swab. In cases where the analyte is present in very low concentrations, this can result in reduced sensitivity due to insufficient amounts of analyte being eluted from the swab into the solution.

Accordingly, there is a need for improved devices and methods for sample extraction that can minimize operator inconsistencies, are simple to use, do not consume electric power and do not rely on laboratory equipment such as vortexers and centrifuges to work.

The inventions disclosed below are mechanisms, devices, and methods that may be used at the point of care to replace the laboratory protocols for maximizing sample recovery from swab samples. The disclosed invention also enables the user to sequentially deliver multiple reagents directly to the sample in the sample extraction device using simple user hand actuated steps. The disclosed invention greatly simplifies the lab-based sample processing protocols and eliminates the need for sophisticated equipment that is required for performing lab-based sample processing protocols.

Referring to FIGS. 7A and 7B, schematics of an exemplary sample extraction device for extracting and processing raw sample attached to a swab are shown. The sample extraction device comprises a sample collection container 705 and a sample processing unit 707 that is may be detachable from the sample collection container in some embodiments. The device in this exemplary embodiment is for swab sample processing and comprises a swab 704 with a screw-top lid 702 attached to the swab shaft 703 and the sample collection container 705. The container comprises threads 706 that mate with the lid 702 of the swab. When the swab is inserted into the container 705 it comes in contact with a scrubbing insert 715, 716 comprising one or more protrusions 713 that make contact with the swab head 704 and scrub the head as the lid is closed and the swab rotates/twirls within the insert. This scrubbing action functions to loosen the sample that is attached to the swab head and thereby elutes it into a buffer or medium 714 contained inside the container. In some embodiments the scrubbing insert may have multiple small bristles 713 that are spatially oriented to make contact with the swab head as it is twirled within the insert. In other embodiments the scrubbing insert may have mechanical elements 716 such as ridges, O-rings and the like that can function to scrub and squeeze the swab head within the insert. The number of threads define the number of turns or full rotations that the swab head 704 makes within the scrubbing insert and may be optimized to maximize sample recovery from the swab.

Similarly, the type and design of the mechanical elements may be optimized for the swab type, to maximize sample recovery. In some embodiments the container may comprise one or more filter membranes 712 that are chosen to filter out unwanted impurities, inhibitors from the sample. The container comprises a quick connect connector 711 such as a luer connector that connects to a detachable sample processing unit 707. In some embodiments the detachable sample processing unit 707 may be a syringe comprising a barrel and plunger 708 and a plunger tip 709. The syringe may comprise one or more grooved depressions 710 that may contain stored reagents in dried, liquid capsule or pelleted form. The grooved depressions containing stored reagents may be spatially oriented such that they are introduced into the sample in a sequential fashion as the plunger tip 709 is withdrawn. In some embodiments the syringe plunger may be withdrawn and pushed repeatedly so as to use forced flow to loosen the biological material present in the sample collection container The stored reagents are not limited to freeze dried or dried down buffers such as lysis buffers, neutralization buffers, binding buffers, wash buffers, pH control buffers, solid phase capture supports such as magnetic beads and the like, enzymes, antibodies, aptamers, conjugation buffers, functionalized particles such as gold nanoparticles, latex particles, magnetic particles and the like, chemiluminescence, or colorimetric detection reagents.

Now referring to FIG. 8 a step by step sequence for performing an exemplary sample processing protocol for recovering raw sample attached to a swab, prior to transferring it to the microfluidic cartridge is illustrated.

Step 1—Swab sample is inserted into the container and the lid is rotated to close.

Step 2—The plunger is withdrawn thereby introducing the eluted sample from the container to the stored reagents in dried format present in the grooved depressions on the syringe barrel.

Step 3—The syringe is detached from the quick connect fitting on the container and the container with the swab is discarded.

Step 4—The syringe is connected to the quick connect sample inlet port on the microfluidic cartridge and the plunger is depressed to transfer the sample into the microfluidic cartridge.

In an exemplary embodiment the container 705 is prefilled with the appropriate swab transport medium such as phosphate buffered saline (PBS), Amies medium, and the like. The swab is inserted into the container and the lid is rotated "n" number of times to close, where n is the number of turns as determined by the threads 706 on the container. When the swab is inserted into the container it makes contact with protrusions and mechanical elements on the scrubbing insert present inside the container such that as the swab rotates within the scrubbing insert, the swab head is scrubbed and squeezed by the mechanical elements so as to loosen the sample attached to the swab head and elute it into the solution/media contained inside the container. The plunger on the attached syringe sample processing unit is then withdrawn, whereby the sample from the container gets filtered through a filter membrane to filter out impurities and inhibitors and collects in the syringe barrel below. When the syringe plunger is withdrawn the sample is introduced to one or more stored reagents in dried, liquid or gelified form, present in the barrel in a sequential fashion.

In an exemplary embodiment for performing a NAAT, the stored dried reagents comprise a pellet of dried lysis buffer that is hydrated and activated when the sample is introduced to it and stored magnetic beads in a liquid format that are re-suspended in the lysate present in the syringe barrel of the sample processing unit. Alternatively, the stored reagents in the sample processing unit may comprise lysis buffer dried down reagents and neutralization buffer dried down reagents, that sequentially get introduced to the sample such that the cells in the sample are first lysed and the lysate is then neutralized by introduction to the second neutralization reagent.

The neutralized sample may then be sequentially introduced to a third grooved depression comprising magnetic beads, also stored in sample processing unit prior to transferring the processed contents to the microfluidic cartridge. Alternatively, the microfluidic cartridge may comprise magnetic beads that have been preloaded into the reagent well present in it such that the neutralized sample lysate is introduced to magnetic beads for sample purification when it is transferred into the microfluidic cartridge.

The described sample extraction device may be used for any biological assay comprising multiple steps involving multiple reagents that need to be delivered to the sample in a predefined sequence and the reagents, steps may be chosen and designed based on the assay that is being performed.

While the illustrated sample collection container and attached sample processing unit described herein is for processing swab samples where the sample is attached to the swab and needs to be eluted to solution for downstream processing, the container may be adapted for different sample types that are not collected on swabs, including but not limited to biological samples such as saliva, blood, plasma, serum, urine, sputum, CSF, tissue, feces, plant, food, soil, small organisms and the like. The stored buffer/media and type of filter used in the container may also be adapted for the downstream assay as well as the sample type.

In an exemplary embodiment, the sample collection container may be used for collecting and processing urine samples. The sample collection container may comprise lysis buffer reagents in dried down format that may be hydrated and activated when the urine is introduced to the container causing cell lysis to occur on the urine sample present in the sample collection container. The sample processing unit may comprise dried down neutralization reagents in it such that the lysate is neutralized when it is aspirated into the sample processing unit. The filter 712 may be chosen such that it retains inhibitors and proteins behind and only allows purified nucleic acids to pass through.

In an exemplary embodiment an alkaline lysis buffer may be used that alters the sample pH to the range between 9-13. The sample at pH 9-13 is then filtered through the membrane filter 712 such as a nitrocellulose or mixed cellulose ester (MCE) membrane with pore size 0.45 um to 0.8 um. Due to the selected pore size and high alkaline pH of the sample, proteins and inhibitors present in the sample are retained behind or bind to the filter membrane and only purified nucleic acids pass through to the next stage into the sample processing unit where the purified lysate is neutralized by the neutralization reagents present in it.

Specimen Processing Unit: Referring to FIGS. 9A and 9B, perspective views and exploded views respectively of an exemplary Specimen Processing Unit are shown. The specimen processing unit comprises a specimen collection container 902 and a lid actuator 903 that facilitates automated sequential reagent delivery to the sample in the container 902 in a predefined, precise timing sequence. FIG. 9B is a schematic exploded view of an exemplary specimen processing unit showing the functional components of lid actuator 903 as a sequential reagent delivery system. In this exemplary embodiment, the lid actuator comprises a unique reagent dispensing unit comprising a reagent pallet 905 comprising one or more reagent pouches 904 comprising stored reagents in dry, liquid or gelified format and; one or more rotary actuating elements 907; comprising spatially oriented mechanical elements 906 including but not limited to protrusions, valves, ridges and the like, that function to actuate the reagent pouches 904 so as to dispense their contents into the specimen collection container 902 in a precise timing sequence as the rotary actuator element 907 rotates in proximity to the reagent pallet 905. In some embodiments the reagents are guided out of a reagent dispense conduit 908 into the specimen collection container 902. In some embodiments the reagents are dispensed under the force or gravity into the specimen collection container. In some embodiments the specimen processing unit comprises a mechanism for providing rotational motion such as a wind-up spring, motor or the like. In some embodiments the reagent dispensing unit may be manually actuated by the user's fingers.

In an exemplary embodiment a wind-up spring is used. Wind-up spring mechanisms are well known and commonly used as mechanical timer devices. A well-known mechanical spring timer is the kitchen egg timer. These mechanisms generate constant rotational motion until completely uncoiled. The wind-up spring mechanism can be designed to completely uncoil in a fixed amount of time by appropriately selecting the spring and gearing mechanism used. Sequential Reagent delivery can be powered by a wind-up spring mechanism that turns on an actuator to deliver reagents to a system in a precise timing sequence. In this invention, the rotary actuating element comprises spatially oriented mechanical elements that interfere with the reagent filled pouches on the reagent pallet at predefined instances along the rotary path of the rotary actuating element so as to deform and squeeze the reagent pouches and thereby deliver the reagents in a predefined precise timing sequence.

This specimen processing unit has advantages compared to typical kits that employ manual reagent delivery protocols using pipettes or droppers, since it is a self-contained system that has all the reagents required for sample processing packaged in a single unit with a simple and contained dispensing and reagent delivery mechanism. Particularly for lab-free settings where only CLIA waived tests (tests that are simple and easy with no risk of user generated errors producing erroneous results) can be performed, this self-contained sample processing unit reduces the risk of erroneous results due to user generated errors by removing complex, time consuming pipetting steps and making reagent delivery possible using simple and ubiquitous twist, slide or rotating motions that don't require skilled operators to perform, and can be automated using a single motor or self-powered wind-up spring actuator so as to further reduce the hands-on time.

Referring to FIGS. 10A, 10B and 10C, instances in the operating sequence as the rotary actuator element 907 rotates relative to the reagent pallet 905 are shown. FIG. 10A shows the position of the rotary actuator element before reagent delivery has occurred. In FIG. 10B the rotary actuator element has moved to a position where the mechanical element 906 present on it interferes with the first reagent pouch in its path thereby deforming it and squeezing its contents into the specimen collection container through the reagent dispense conduit 908. In FIG. 10C the rotary actuator element has moved to a position along its path where the mechanical element 906 interferes with the second reagent pouch thereby deforming it and squeezing the contents of the second reagent pouch into the specimen collection container.

The exemplary embodiment described in FIGS. 9A-9B here utilizes rotational motion for performing the actuation steps. However other embodiments could utilize linear motion to accomplish the same tasks, e.g. using one or more linear sliding actuator elements. The actuating elements may be oriented in different spatial dimensions so as to be able to sequentially interfere with the different spatial dimensions of the sample processing device or microfluidic cartridge.

Referring to FIG. 11 an exploded schematic of a rotary shaft based specimen processing unit is shown. This unique embodiment of the invention employs a rotary shaft actuator element 1103 that provides an additional dimension of control for assay automation. The rotary shaft actuator element comprises one or more spatially oriented mechanical elements 1102 that interfere with the reagent pouches 1105 on the reagent pallet 1104 so as to actuate them and dispense their contents in a predefined sequence.

In some embodiments a detection unit may be integrated into the specimen processing unit to facilitate detection of the analyte directly in the self-contained system without transferring out of the container to a detection unit. This detection unit may be visual using colorimetric reagents that cause a color change to occur in the container depending on the presence or absence of the analyte, or immunochromatographic detection using dipstick or lateral flow devices. In some embodiments the lateral flow device may be integrated on the surface of the specimen collection container or in the lid of the specimen processing unit.

While each reagent may be packaged in their individual reagent pouch and assembled on the microfluidic cartridge, this method results in a more complicated assembly process where each reagent pouch needs to be individually assembled and sealed to the cartridge. In some embodiments it is preferable to create a reagent card comprising multiple reagent pouches that may be assembled as a single unit on the microfluidic cartridge. Referring to FIG. 12, a perspective view of an exemplary reagent card 1201 showing individual reagent pouches 1202 and a flow through reagent pouch 1203 is depicted. The reagent card may be designed in a shape that easily mates and aligns with a mating groove on the cartridge during assembly. The reagent cards may be filled manually or using multiple automatic pipetters in a custom fixture, for dispensing the desired fluid volumes into each reagent pouch prior to frangible foil sealing. In some embodiments the reagent cards may comprise molded features in addition to the pouches to aid in placing and alignment of the reagent pouch card to the microfluidic cartridge. When an actuation force is applied to the reagent pouches either individually in a sequential fashion or parallelly to multiple reagent pouches on the card, the frangible foil seal on the bottom ruptures and allows the reagent to flow through fluidic channels into the appropriate reaction chambers in the fluidic cartridge. The actuation force may be distributed to the reagent card through a plunger comprising spatially oriented protrusions that come in contact with one or more reagent pouches sequentially during actuation.

In some embodiments, it may be required to mix or combine one or more reagents present in the reagent pouches with each other. Active mixers where external energy is applied to agitate the fluid or passive mixers where the contact area and contact time of the fluids to be mixed are increased through the use of specially designed geometries and channel configurations have been used in the past for mixing on microfluidic devices. In some embodiments, it may be required to mix two or more reagents where at-least one reagent is in solid form or comprises solid particles in a low or high viscosity liquid medium or is a highly viscous liquid or a gel. In microfluidic cartridges, solid reagents are often stored by drying them directly in the reaction chamber where they are then reconstituted with a liquid reagent during use which may be a reconstitution buffer or even the raw or processed liquid sample that is being analysed. These dried reagents are are brought to the desired concentration with a known volume of reconstitution liquid. In some cases it is desirable to dry or lyophilize reagents and store them directly in the reaction chamber of the microfluidic device. For example, lyophilized master mixes for nucleic acid amplification tests (NAATs) do not require cold storage and enable the microfluidic cartridge to be stored at room temperature. In other cases, the drying process can negatively affect the reagent causing its efficacy to be reduced or permanently destroyed. For example, chargeswitch magnetic beads for nucleic acid sample preparation, supplied by Thermofisher Scientific (Carlsbad CA) become non-functional once dried out and need to be kept in solution at all times. Some magnetic beads comprise functional coatings such as the cellulose coated magnetic beads from the Magazorb® DNA extraction kit from Promega, that irreversibly aggregate when dried and become non-functional. As a result it is important to store the beads in their liquid matrix to preserve their functionality. Although it may be possible to develop custom drying processes using custom chemistries that help preserve the functional coating on beads, developing custom processes are often expensive and require extensive testing to ensure there's no loss in functionality. Hence storing functionalized particles such as magnetic beads in their liquid matrix is preferable. However, on-chip storage of magnetic beads in liquid format comes with its own slew of challenges. Specifically, the magnetic particles are stored at very high concentrations in the liquid matrix (often ranging from 5 mg/ml to 50 mg/ml) and are then diluted with the sample and buffers to meet the binding capacity requirements. The manufacturer provided protocol requires very small volume of the magnetic bead reagent required which typically ranges from 10 ul to 40 ul per test is hard to package in foil sealed reagent pouches without running into significant dead volume issues, due to manufacturing process limitations (50 ul minimum volume). Additional dead volumes in the channels or fluidic conduits leading to the reaction chamber also result in significant loss of reagent during dispensing. For example: a channel of cross section 750 um×750 um and length of 1 inch has 15 uL of dead volume. Compounding this problem, there could be as much as 20% of the reagent that may be still present in the collapsed reagent pouch during the dispensing process.

Loss of even 20% of the concentrated and essential reagent due to it being trapped in dead spaces is not desirable. The invention in this disclosure uses a flow-through based approach to facilitate effective transfer and mixing of reagents on a microfluidic device. The flow through system employs a fluid medium which is either a liquid or gas that is present in a large quantity that is used as a transfer reagent to transfer/displace the reagent present in the flow through reagent pouch effectively into the reaction chamber on the microfluidic device. The transfer reagent here could be an immiscible fluid such as mineral oil (liquid) or air (gas) or a miscible liquid such as an aqueous buffer or the like. When Immiscible liquids and gases enter the flow-through reagent pouch they effectively displace all the contents of the reagent pouch into the reaction chamber of the microfluidic device. When miscible fluids such as buffers enter the flow through chamber they mix with the reagent present in the flow through chamber such that the contents entering the reaction chamber of the microfluidic device are a mixture of the transfer reagent and the reagent in the flow through reagent pouch. This method offsets the effects of dead volume in the reagent pouch or the microfluidic device by filling them with the transfer reagent. Because the volume of the transfer reagent is not essential or critical to the reaction occurring in the reaction chamber of the fluidic chip, this method helps to effectively transfer the reagent present in the flow through reagent pouch, whose volume is critical to the proper functioning of the assay.

Alternatively the transfer medium could be a form of reconstitution buffer that would rehydrate a lyophilized reagent pellet that may be present in the flow through reagent pouch. In some embodiments, the transfer medium may be the liquid sample that is being analysed. During the interaction of the transfer medium and the contents of the flow through reagent pouch, mixing of the two occur. This mixing could be further aided by increasing the contact area and contact time. Numerous approaches such as increasing the channel length, reducing the channel cross section, adding physical barriers to impede the flow rate, increasing the fluid pressure and causing turbulence in the fluid flow are few approaches that can be used to facilitate mixing.

In one embodiment, this method mitigates loss of functionalized particles such as magnetic beads as well as aids in flow-through based mixing and homogenizing the particles/beads to facilitate the binding of the analyte present in solution to the functionalized particles/beads.

Referring to FIG. 13A, cross-section schematics of an exemplary microfluidic device comprising reagent card comprising a transfer reagent pouch 1303 filled with a transfer reagent 1306 and a flow-through reagent pouch 1302 comprising magnetic beads/particles in liquid medium. The transfer reagent pouch is connected to the inlet of the flow-through reagent pouch via a transfer fluidic conduit 1308 on the microfluidic device, that is capped with a frangible seal 1304. The flow through reagent pouch comprises rupture elements (balls) 1305 and is connected to the reaction chamber on the microfluidic device through an exit fluidic conduit 1309. When actuation force is applied as shown in FIG. 13B, the rupture elements break the frangible seal present under them thereby opening up a pathway for the transfer reagent to enter the flow through reagent pouch and displace its contents. In some embodiments the rupture elements may be present on the microfluidic device instead of inside the flow through reagent pouch.

Example: The manufacturer provided protocol calls for 40 ul of Chargeswitch® magnetic beads and 300 ul of the provided binding buffer to be added to 600 ul of bacterial cell lysate. To implement this protocol on the automated microfluidic device described herein, the 600 ul of cell lysate is first dispensed using a dispensing dropper or syringe into the reaction chamber on the microfluidic device. The flow through reagent pouch would contain 40 ul of magnetic beads. Assuming 60 ul of total dead volume in the system (i.e. volume remaining in the crushed flow through reagent pouch, fluidic conduits and in the crushed transfer reagent pouch), the transfer reagent pouch would contain 360 ul of binding buffer to offset the loss due to dead volume. This dead volume is specific to the design of the microfluidic device and can easily be calculated from the device geometry, and confirmed using experimental methods. Upon actuation force being applied, the frangible seals are ruptured thereby allowing the binding buffer to enter the flow through reagent pouch comprising magnetic beads. The turbulent flow of the binding buffer as it enters the flow through reagent pouch begins to resuspend the magnetic beads that may have sedimented with storage. The resulting product of resuspended magnetic beads in binding buffer then enter the reaction chamber containing the cell lysate through the exit fluidic conduit 1309 to complete the binding protocol.

This system avoids using complex systems like metering pumps that will add to the cost and complexity of the device.

Oil/Immiscible Phase Dispensing System

While in some embodiments an oil-filled reagent pouch may be used to store the oil phase, that can be dispensed upon the application of an actuation force. However, reagent pouches are very hard to manufacture and fill and seal without dead air zones. Typical manufacturing tolerances for dead air in the pouch may be of the order of 10% to 20% of the total pouch volume. Particularly with viscous, oil phase reagents, trapped air can lead to the occurrence of air bubbles in the oil phase which leads to reproducibility issues and problems with the transfer of magnetic particles within the immiscible oil phase or between the miscible aqueous and immiscible oil phases. Additionally, since the flow of the oil phase out of the reagent pouch during dispensing may be turbulent, this may results in formation of air pockets in the microfluidic device as the oil phase fills each reaction well and the primary channel. While there are workarounds to preventing the formation of air bubbles in the system by optimizing channel and well geometries to promote laminar flow as well as by implementing inline debubbling mechanisms such as microporous hydrophobic/oleophobic PTFE membranes that selectively expel trapped air while liquid doesn't leak through, another unique embodiment is described herein. In this unique embodiment, smooth laminar flow is created by utilizing the pressure head of the oil phase. This may be supplemented with optimized channel and well geometries to create perfect bubble free oil phases in the primary channel without the need for complicating the system by using debubbling mechanisms. The pressure head based approach requires a vent to enable fluid flow which may be created by rupturing a frangible seal during dispensing. Furthermore, it is not affected by the presence of air inside the oil phase container since the air is too light to displace the oil phase.

Referring to FIGS. 14A-14B, an exemplary microfluidic device showing oil/immiscible phase dispensing system 1401 is shown prior to the application of the actuation force FIG. 14A. and after the application of actuation force FIG. 14.B. The microfluidic chip based oil/immiscible phase dispensing system 1401 comprises an oil storage container 1402 that holds the desired volume of oil/immiscible or liquid reagent 1404. The oil/immiscible phase storage container comprises of an air vent conduit 1403, and a oil/reagent conduit 1405 that serve to connect the container 1402 to the vent and the reaction chambers respectively on the microfluidic device. A deformable lidding 1407 that houses a rupture ball 1408 is present at the vent port and the oil/reagent exit port. The vent port 1409 and oil/reagent exit port 1410 are sealed by a frangible seal 1406 and separated from the microfluidic device by the same frangible seal that functions as a one time valve. Upon the application of an actuation force as shown in FIG. 14B, the deformable liddings at the air vent port and the oil/reagent exit port are crushed and cause the rupture ball 1408 to pierce the frangible seal. This rupturing connects the air vent port and oil/reagent exit port to the vent on the microfluidic device and the reaction chambers on the microfluidic device respectively.

Referring to FIG. 15, an exemplary embodiment of the sample-to-answer microfluidic device for nucleic acid amplification tests (NAATs) is depicted. The microfluidic device comprises a reagent card 1201, oil dispensing system 1401 and lateral flow strip 1505 for detection, assembled onto the microfluidic chip. The microfluidic chip itself comprises multiple reaction chambers 1502 connected together by the primary channel 1503. The inlet channels 1504 connect the reagent pouches 1303 on the reagent card to the individual reaction chambers. An actuation element on the lid of the instrument which comprises a plunger with spatial topography matching that of the spatial positions of the individual reagent pouches and the deformable lidding element 1407 on the oil dispensing system 1401 is used to provide the actuating force to rupture the frangible seals.

In a typical sequence of operations:

1. The sample is injected into the cartridge or dispensed via a sample inlet.
2. The cartridge is inserted into the instrument and the lid is closed. The closing of the lid provides the actuation force to rupture the frangible seals of on the reagent card and oil dispensing system.
3. The user inputs a start command by pressing a button to start the magnetic bead based sample processing and amplification sequence.
4. The results are displayed on the lateral flow strip after the test is completed.

General Definitions

Although specific terms are employed herein, they are used in a generic and descriptive sense only and not for purposes of limitation. Unless otherwise defined, all technical and scientific terms used herein have the same meaning as commonly understood by one of ordinary skill in the art to which this presently described subject matter belongs.

"Nucleic acid" as used herein means a polymeric compound comprising covalently linked subunits called nucleotides. A "nucleotide" is a molecule, or individual unit in a larger nucleic acid molecule, comprising a nucleoside (i.e., a compound comprising a purine or pyrimidine base linked to a sugar, usually ribose or deoxyribose) linked to a phosphate group.

"Polynucleotide" or "oligonucleotide" or "nucleic acid molecule" are used interchangeably herein to mean the phosphate ester polymeric form of ribonucleosides (adenosine, guanosine, uridine or cytidine; "RNA molecules" or simply "RNA") or deoxyribonucleosides (deoxyadenosine, deoxyguanosine, deoxythymidine, or deoxycytidine; "DNA molecules" or simply "DNA"), or any phosphoester analogs thereof, such as phosphorothioates and thioesters, in either single-stranded or double-stranded form. Polynucleotides comprising RNA, DNA, or RNA/DNA hybrid sequences of any length are possible. Polynucleotides for use in the present invention may be naturally-occurring, synthetic, recombinant, generated ex vivo, or a combination thereof, and may also be purified utilizing any purification methods known in the art. Accordingly, the term "DNA" includes but is not limited to genomic DNA, plasmid DNA, synthetic DNA, semisynthetic DNA, complementary DNA ("cDNA"; DNA synthesized from a messenger RNA template), and recombinant DNA (DNA that has been artificially designed and therefore has undergone a molecular biological manipulation from its natural nucleotide sequence).

"Amplify," "amplification," "nucleic acid amplification," or the like, refers to the production of multiple copies of a nucleic acid template (e.g., a template DNA molecule), or the production of multiple nucleic acid sequence copies that are complementary to the nucleic acid template (e.g., a template DNA molecule).

The terms "top," "bottom," "over," "under," and "on" are used throughout the description with reference to the relative positions of components of the described devices, such as relative positions of top and bottom substrates within a device. It will be appreciated that the devices are functional regardless of their orientation in space. Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, parameters, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments, ±100% in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

All publications, patent applications, patents, and other references mentioned in the specification are indicative of the level of those skilled in the art to which the presently disclosed subject matter pertains. All publications, patent applications, patents, and other references are herein incorporated by reference to the same extent as if each individual publication, patent application, patent, and other reference was specifically and individually indicated to be incorporated by reference. It will be understood that, although a number of patent applications, patents, and other references are referred to herein, such reference does not constitute an admission that any of these documents forms part of the common general knowledge in the art.

Although the foregoing subject matter has been described in some detail by way of illustration and example for purposes of clarity of understanding, it will be understood by those skilled in the art that certain changes and modifications can be practiced within the scope of the appended claims.

What is claimed is:

1. A microfluidic device comprising:

a reagent-dispensing unit comprising at least one reagent pouch comprising one or more reagents and a sealing layer;

wherein said at least one reagent pouch comprises at least a first non-compartmentalized reagent pouch comprising an aqueous reagent and a non-aqueous immiscible reagent packaged together in said first non-compartmentalized reagent pouch;

at least one actuator element comprising spatially oriented magnets, and at least one protrusion configured to apply an actuation force to said at least one reagent pouch to dispense said one or more reagents into a rotatable microfluidic cartridge; and wherein said rotatable microfluidic cartridge comprises a plurality of wells, is positioned proximate to said at least one actuator element, is configured to receive magnetic beads, and is configured to rotate about a central axis such that in a single actuation step comprising rotating the microfluidic cartridge said spatially oriented magnets capture, re-suspend, and transport said magnetic beads between said plurality of wells.

2. The microfluidic device of claim 1 wherein said reagent dispensing unit further comprises at least one sharp object or protrusion configured to rupture said sealing layer and deliver said one or more reagents into the microfluidic cartridge when an actuation force is applied to the at least one reagent pouch.

3. The microfluidic device of claim 1 wherein said reagent dispensing unit comprises at least one flow through pouch fluidically connected to one or more reaction chambers and wherein said at least one protrusion on said at least one actuator element is configured to make contact with the flow through pouch at a predefined time in an assay sequence and actuate the flow through pouch.

4. The microfluidic device of claim 3 wherein said at least one actuator element comprises one or more spatially oriented heater elements configured to provide stable single temperature heat or thermal cycling for isothermal or polymerase chain reaction (PCR) based amplification of nucleic acids.

5. The microfluidic device of claim 4 wherein said at least one actuator element comprises a first actuator element comprising said spatially oriented magnets and said at least one protrusion and a second actuator element comprising said one or more spatially oriented heater elements, and wherein said microfluidic cartridge is sandwiched between said first actuator element and said second actuator element.

6. The microfluidic device of claim 1 further comprising:

at least one inlet conduit;

at least one reagent well;

at least one waste well;

wherein the inlet conduit, the reagent well, and the waste well are fluidically connected and configured such that there is an interface between the sealing layer of said at least one reagent pouch and the inlet conduit such that one or more reagents are delivered into the reagent well via the inlet conduit when an actuation force is applied to the at least one reagent pouch of the reagent dispensing unit and any excess reagent that overflows out of the reagent well is collected in the waste well.

7. The microfluidic device of claim 6 wherein said first non-compartmentalized reagent pouch comprises a sealing layer and wherein the aqueous reagent contained in said first non-compartmentalized reagent pouch is closer to the interface between the sealing layer and the inlet conduit than the non-aqueous immiscible reagent contained in said first non-compartmentalized reagent pouch.

8. The microfluidic device of claim 7 wherein the aqueous reagent and non-aqueous immiscible reagent are separated by a phase forming an aqueous reagent layer and a non-aqueous immiscible reagent layer.

9. The microfluidic device of claim 8 wherein said actuation force causes said aqueous reagent to be dispensed to the reagent well via inlet conduit followed by said non-aqueous immiscible reagent and wherein any excess non-aqueous immiscible reagent that overflows is collected in the waste well.

10. The microfluidic device of claim 6 wherein the non-aqueous immiscible reagent is less dense than the aqueous reagent thereby forming an aqueous reagent layer and a non-aqueous immiscible reagent layer and wherein said aqueous reagent layer is above the non-aqueous immiscible reagent.

11. The microfluidic device of claim 6 comprising a plurality of reagent wells that are connected to each other and to one or more reagent dispensing units through a primary channel.

12. The microfluidic device of claim 11, wherein said one or more reagents comprises at least one aqueous reagent and at least one non-aqueous immiscible reagent and wherein said microfluidic device is configured such that after said one or more reagents are dispensed to the microfluidic cartridge, the plurality of reagent wells are filled with said at least one aqueous reagent and connected to each other through the primary channel filled with said at least one non-aqueous immiscible reagent, and wherein a phase is formed between the non-aqueous immiscible reagent in the primary channel and the aqueous reagent in the reagent wells.

13. The microfluidic device of claim 11, comprising a plurality of reagent pouches that are separated from the inlet conduits to the plurality of reagent wells by frangible seals.

14. The microfluidic device of claim 1, further comprising a sample inlet port through which a sample may be injected into the microfluidic device.

15. The microfluidic device of claim 1 wherein said at least one protrusion is configured to apply an actuation force to said at least one reagent pouch at a predefined time in an assay sequence to dispense said one or more reagents into said microfluidic cartridge.

16. The microfluidic device of claim 1 further comprising at least one plunger configured to apply an actuation force to said at least one reagent pouch at a predefined time in an assay sequence to dispense said one or more reagents into the microfluidic cartridge.

17. The microfluidic device of claim 3 wherein said flow through pouch further comprises a sealing layer and a rupture element configured to rupture said sealing layer.

18. The microfluidic device of claim 1 wherein said microfluidic cartridge comprises one or more lyophilized or gel reagents.

19. The microfluidic device of claim 3 wherein said flow through comprises a reagent and is fluidically connected to a transfer reagent source wherein, upon actuation, a transfer reagent flows into said flow through pouch.

20. The microfluidic device of claim 19 wherein said transfer reagent comprises an immiscible fluid that displaces said reagent in said flow through pouch such that it flows into said reaction chamber.

21. The microfluidic device of claim 19 wherein said transfer reagent comprises a miscible reagent that mixes with said reagent in said flow through pouch producing a reagent mixture that flows into said reaction chamber.

22. The microfluidic device of claim 19 wherein said reagent in said flow through reagent pouch comprises a dried or lyophilized reagent and wherein said transfer reagent comprises a reconstitution buffer that rehydrates said reagent in said flow through reagent pouch.

23. The microfluidic device of claim 19 wherein said reagent in said flow through pouch comprises magnetic particles in liquid medium and wherein said transfer reagent displaces said reagent in said flow through pouch.

24. The microfluidic device of claim 3 wherein said flow through pouch comprises a chamber comprising a reagent, wherein said flow though pouch further comprises a vent port and a reagent exit port, and wherein said vent port and said reagent exit port flank said chamber, and wherein said vent port and said reagent exit port each comprise a rupture element.

25. The microfluidic device of claim 16 wherein said reagent dispensing unit comprises a plurality of plungers and a plurality of reagent pouches and wherein said plurality of plungers are configured to come in contact with all the plurality of reagent pouches at the same instant so as to depress and release all the one or more reagents from the plurality of reagent pouches in parallel from a single actuation step.

26. The microfluidic device of claim 16 further comprising a locking mechanism configured to lock the at least one plunger in a depressed position, thereby preventing backflow of said one or more reagents into the at least one reagent pouch.

27. The microfluidic device of claim 26 wherein the locking mechanism comprises barbed pins inside a locking bore configured to restrict the motion of the at least one plunger to a direction that facilitates the depressing of the at least one reagent pouch during the application of actuation force.

28. The microfluidic device of claim 25 wherein said plurality of plungers comprise spatially oriented protrusions with varying depths so as to make contact with a desired reagent pouch from among the plurality of reagent pouches in a preferred sequence so as to facilitate sequential reagent delivery into the microfluidic device as the plurality of plungers are depressed.

* * * * *